(12) United States Patent
Hidaka

(10) Patent No.: US 7,347,293 B1
(45) Date of Patent: Mar. 25, 2008

(54) WORK VEHICLE

(75) Inventor: Shigemi Hidaka, Osaka (JP)

(73) Assignees: Yanmar Agricultural Equipment Co., Ltd., Osaka (JP); Serei Industry Co., Ltd., Okayama (JP)

( * ) Notice: Subject to any disclaimer, the term of this patent is extended or adjusted under 35 U.S.C. 154(b) by 0 days.

(21) Appl. No.: 10/488,713

(22) PCT Filed: Sep. 16, 1999

(86) PCT No.: PCT/JP99/05063

§ 371 (c)(1),
(2), (4) Date: Aug. 3, 2004

(87) PCT Pub. No.: WO00/35736

PCT Pub. Date: Jun. 22, 2000

(30) Foreign Application Priority Data

Dec. 16, 1998 (JP) ................... 10-357351

(51) Int. Cl.
*B62D 55/00* (2006.01)
*B62D 11/04* (2006.01)

(52) U.S. Cl. .................... 180/9.44; 180/6.32

(58) Field of Classification Search ........... 180/9.1, 180/9.44, 6.24, 6.2, 6.32; 56/11.1
See application file for complete search history.

(56) References Cited

U.S. PATENT DOCUMENTS

| | | |
|---|---|---|
| 2,874,591 A | 2/1959 | Thoma |
| 3,876,021 A | 4/1975 | Baumgartner |
| 4,998,591 A | 3/1991 | Zaunberger |
| 5,558,590 A | 9/1996 | Okada et al. |
| 5,584,167 A | 12/1996 | Hamada et al. |
| 5,699,656 A * | 12/1997 | Hamada et al. .............. 56/11.1 |
| 5,857,532 A | 1/1999 | Satzler |
| 5,992,260 A | 11/1999 | Fujiki et al. |
| 6,067,872 A | 5/2000 | Miyahara et al. |
| 6,152,248 A | 11/2000 | Hidaka et al. |
| 6,325,166 B1 | 12/2001 | Shimada et al. |
| 6,336,886 B1 * | 1/2002 | Ohya et al. .................... 475/23 |
| 6,408,960 B1 | 6/2002 | Hidaka et al. |
| 6,484,828 B2 * | 11/2002 | Hidaka et al. .............. 180/6.38 |
| 2002/0005302 A1 | 1/2002 | Hidaka |

FOREIGN PATENT DOCUMENTS

| | | |
|---|---|---|
| EP | 0 869 048 | 10/1998 |
| JP | 9-39828 | 2/1997 |

(Continued)

*Primary Examiner*—Tony Winner
(74) *Attorney, Agent, or Firm*—Jordam and Hamburg LLP

(57) ABSTRACT

A working vehicle such as a mobile agricultural machine is designed such that it has an improved working efficiency if any spinning turn is not required, and has an improved running property in a wet farm. The vehicle has a pair of right and left crawlers (2), a speed change apparatus (25) for imparting traction force to the crawlers, a speed change lever (73) operable to control the speed change apparatus so as to alter running speed of the vehicle in a step-less manner. The vehicle further has a steering apparatus (28) and a steering wheel (19) operable to control the steering apparatus so as to alter difference in the running speeds between the crawlers (2). The running speed generally determined for each crawler by the speed change lever (73) can be decreased voluntarily and proportionally to an operated angle of the steering wheel (19).

8 Claims, 34 Drawing Sheets

FOREIGN PATENT DOCUMENTS

| | | |
|---|---|---|
| JP | 9-221058 | 8/1997 |
| JP | 10-264845 | 10/1998 |
| WO | 97/09870 | 9/1997 |
| WO | 98/10972 | 3/1998 |
| WO | 98/32645 | 7/1998 |
| WO | WO-98/32645 | 7/1998 |

* cited by examiner

WORK VEHICLE

FIELD OF THE INVENTION

The present invention relates to a working vehicle such as a combine for the continuous reaping and threshing of grain stalks in a farm, such as a cultivating tractor or any other mobile agricultural machine used for the care of farms.

BACKGROUND OF THE INVENTION

It has been known to drive the agricultural vehicle at any selected speed by means of a speed change lever, with a possibility that said vehicle could be controlled to change its path of advance by means of a steering wheel. In the prior art of this type, the right and left crawlers receive traction forces through respective belt- or hydraulic-reduction apparatuses controlled by the speed change lever in a step-less manner. A differential gearing is also involved to be controlled by a step-less speed reducer that in turn is operated by the steering wheel so as to smoothly change the difference in rotational speed between the right and left crawlers. If only the steering wheel is operated, movement speed of the vehicle would remain almost constant during its straight advance and its turning motion. Thus, it has been necessary for drivers of those vehicles to lower the running speed thereof when causing them to make a 'spinning turn' of a relatively small radius. In other words, those drivers have had to quickly maneuver both the steering wheel and speed change lever in order to make a turn at an end bare area in any farm. It has also been known to automatically lower the travelling speed of the vehicle in response to the maneuvering of its steering wheel. In this case, the speed will be raised also automatically when said steering wheel is operated to resume the vehicle's straight running. Any troublesome operations for speed change of the vehicle will no longer be required even when the steering wheel is operated to cause the vehicle to make a spinning turn. However, such a system has proved problematic or disadvantageous in that the vehicle speed would unintentionally be reduced even during the vehicle's works free from any spinning motion. In this event, operation efficiency would be impaired and such an unwanted speed reduction in a wet farm would cause therein a non-smooth or unreliable advance of the vehicle. The steering mechanism may be designed such that rotation of the steering wheel brings about a lesser change in vehicle speed. Such a modification also is unsatisfactory because the vehicle will not be able to make a quick turn on road on one hand and a spinning turn in dry farms.

DISCLOSURE OF THE INVENTION

The present invention relates to a working vehicle such as a mobile agricultural machine comprising a pair of left-side and right-side traction crawlers 2 that are driven through a speed change apparatus 25 at any traveling speed selected in a step-less manner by means of a speed change lever 73, and the working vehicle further comprising a steering apparatus 28 that is operated by means of a steering wheel 19 so as to differentiate the speeds of left-side and right-side crawlers 2 relative to each other also in a step-less manner. The working vehicle provided herein is characterized in that the traveling speed controlled by means of the speed change lever 73 is reduced in proportion to an angular displacement of the steering wheel 19, wherein the ratio of speed reduction to a steered angle, i.e., the angular displacement of said wheel 19 can be altered freely at anytime. By virtue of this feature, the ratio of speed reduction to the steered angle may be lowered to cause the vehicle to make a gentle turn within wet farms and, to thus move thereon smoothly for efficient performance of various works therein.

In the invention, the speed change lever 73 is operatively connected to the speed change apparatus 25 by a cooperative interconnect member 178 designed such that the traveling speed will be reduced in proportion to operation degree of the steering wheel 19. A third or stand-by interconnect member 179 does also intervene between these lever 73 and apparatus 25 so as to operatively and occasionally connect them to each other. It is possible to select any desired one of said interconnect members 178 and 179 so as to alter traveling behavior and turning behavior of the vehicle, without modifying control mechanism in the speed change apparatus 25. Thus, the vehicle can selectively be driven to make slow and gentle turns or, alternatively quick and acute turns.

Also in the invention, the so-called spinning turn mode in which one crawler 2 located 'inside' the other with respect to radius of turn locus is driven in reverse direction, can be selected on demand to substitute for the non-spinning turn mode in which both the 'inside' and 'outside' crawlers 2 are rotated in the same direction even at a maximum angular operation of the steering wheel 19. If the spinning turn is selected, then the vehicle will sharply spin on road or in dry farms. If contrarily the non-spinning turn is selected, then it will make sure turns in wet farms or on mud. By virtue of such a changeover from the former mode to the latter, or vice versa, the vehicle is improved in its steering performance and maneuverability.

Further, the steering apparatus 25 is constructed such that a maximum output torque will be maintained in the vehicle at lowered travel speeds, if and when the steering wheel 19 is operated beyond a certain predetermined limit. The vehicle can now make surer and easier turns at lower travel speeds, because variation in its turning torque is diminished and not seriously affected by any change in resistance against its travel.

It also is ensured herein that the 'outside' and 'inside' crawlers 2 be driven at different speeds when making a turn controlled by the steering apparatus 28, such that the 'outside' crawler 2 is kept substantially at the same speed as that at which it will move straightly under control by the speed change apparatus 25. This is enabled by automatically controlling the speed change apparatus 25 in response to the steering apparatus 28, and more in detail, by spontaneously lowering the speeds of those 'outside' and 'inside' crawlers 2 if and when the latter apparatus is operated beyond the given limit. Thus, the 'outside' crawler 2 will not move faster when making a turn than when moving straight, although the steering apparatus 28 commands the right-side and left-side crawlers to gradually change their speeds in harmony but in opposite directions, viz., accelerating one and decelerating the other. In other words, the 'outside' crawler 2 will no longer operate undesirably at any speed remarkably higher than a normal speed of straight advance, whereby the crawlers do not slide sideways at all even when making a turn of small radius at a bare end area of a farm. The vehicle turning in this way will now take easily its next position for a subsequent travel course, without causing an operator of this vehicle to slow down it so as to decrease speed of its center as compared with the speed of straight running. An engine 21 of the vehicle is now protected well from slowing down due to any overload caused by an increased resistance which the crawlers making a turn would encounter. By virtue of these features, the vehicle can make easier turns at the bare end areas and can be more simply operated to do works making reciprocal travels between those bare ends. Both the crawlers 2 are decelerated in response to the steering action beyond the limit, as discussed above, so that traction force for turn will not show any greater change than ever, even though a turn radius being reduced by steering the crawlers 2 would increase resistance against traction of them. Smoother spinning turns are now possible at those bare end areas in any farm yard. Steering operation can now smoothly decrease travel speed whilst maintaining turning force necessary for the crawlers to make a turn such as a spinning turn, thereby affording smaller radius turns at lowered travel speeds.

The vehicle may comprise a steering input shaft 87 rotated by the steering wheel or the like member 19, a speed change input shaft 91 rotated by the speed change lever or the like member 73, a speed change mechanism 124 for operatively connecting the latter input shaft 91 with the speed change apparatus 25, and a steering mechanism 118 for operatively connecting the former input shaft 87 with the steering apparatus 28. Degree to which the steering mechanism 118 can be operated is made herein be proportional to such an extent to which the speed change mechanism 124 will be operated. In other words, the degree of operation of the former mechanism 118 will be elevated to follow an increased operation extent of the latter one 124 in such a manner that the faster the vehicle advances, the more intensively it will be steered. Thus, irrespective of degrees of angular displacement which the steering wheel 19 will make from time to time, radius of turning locus of the right-side and left-side crawlers 2 will be kept almost constant. This will assist the vehicle to more readily change in its speed for agricultural works or alter its running path to be in parallel with any row of crops.

A steering input member 95 and a speed change input member 96 may be disposed on the steering input shaft 87 so as to rotate about the axis of the speed change input shaft 91. A speed change output member 120 secured to a speed change shaft 119 is operatively connected by a speed changing link 121 to the speed change input member 96, thereby forming the speed change mechanism 124. A steering output member 114 secured to a steering shaft 113 is operatively connected by a steering link 115 to the steering input member 95, thereby forming the steering mechanism 118. Thus, the steering input shaft 87 may rotate to actuate both the steering and speed change input members 95 and 96 in unison so that the turning of the vehicle will be synchronized with the slowing down thereof. In addition, the speed change input member may rotate to actuate both the speed change and steering input members 96 and 95 in unison so that the radius of turn can easily be increased or decreased in harmony with speed change, with a neutral position of the speed change mechanism rendering idle the steering mechanism.

One and the same closed box-shaped casing 71 houses the steering input shaft 87 and steering mechanism 118 for linking the steering wheel 19 to the steering apparatus 28, together with the speed change mechanism 124 for linking the step-less reducer 25 to the speed change lever 73. The mechanisms 118 and 124 will thus constitute a unit within such a common casing 71, enhancing precision and simplicity of assembling works. Further, those mechanisms 118 and 124 can easily be associated with each other within said casing 71 in such a manner that travel speed is lowered in unison with steering operation. Any raised load to steer the crawlers 2 will surely protect the engine 21 from being overloaded, because each crawler is simultaneously geared down at that time to a lower velocity. Therefore, farm works will now be improved in smoothness, efficiently using power from the engine 21 and by virtue of a higher steerability.

The speed change input shaft 91 caused to rotatingly swing by the speed change lever 73 or the like is journaled in the steering column or casing 71 by means of bearings 92. This structure is advantageous in that assembly accuracy is enhanced to diminish rickety motion of the input shaft and relevant members, improving dynamic strength thereof and decreasing frictional resistance applied thereto. Reliability and adjustability of operation are improved for the speed change mechanism, also saving labor in maintenance thereof.

The speed change link 121 connected to the speed change apparatus 25 as well as the steering link 115 connected to the steering apparatus 28 are in turn operatively connected to the interconnect or speed change input member 96, which is removably fixed on the steering input member 95 operated with the steering wheel 19. One of these members 96 is easy to adjust in position relative to the other 95, thereby making it possible to maintain substantially constant the controlling relationship between speed change and steering apparatuses 25 and 28. This feature facilitates change in travel speed and improves steerability, further enabling the mounting and dismounting of the interconnect 96 together with the links 121 and 115 fixed thereon so that assembly and maintenance of them are rendered easier. In addition, position of the steering input member 95 can be altered relative to the speed change and steering links 121 and 115. Positional relationship between these links will no way be adversely affected, but rendering easier the works for assembly, maintenance and/or adjustment of said member and links.

Further, the steering input member 95 and speed change input member 96 may operatively be connected to the steering input shaft 87 so as to freely rotate about the axis of the speed change input shaft 91. The speed change output member 120 operatively born by the speed change output shaft 119 is in turn connected operatively by the speed change link 121 to the speed change input member 96, thereby constituting the speed change mechanism 124. The steering output member 114 operatively born on the steering output shaft 113 is in turn connected operatively by the steering link 115 to the steering input member 95, thus forming the steering mechanism 118. A speed change joint 123 serves as a hinge between the speed change output member 120 and link 121, and a steering joint 117 serves as a hinge between the steering output member 114 and link 115. Both the joints 123 and 115 are disposed in alignment with the axis 'D' of the steering input shaft 87. The speed change input member 96 and link 121 swing along a reversed-conical locus, with the steering input member 95 and link 115 likewise swinging along another reversed-conical locus. By virtue of these features, the vehicle can easily and smoothly be accelerated or decelerated and readily brought into parallel with a row of corps during agricultural works. Its travel speed can be lowered while being steered to make a turn, and can also readily be changed to increase or decrease radius of its turning or to cease it. The steering wheel 19 or the like, the speed change and steering mechanisms 124 and 118 are now integrated to form a compact assembly. The so-called "reversed steering" will never take place when forward travel is switched over to rearward travel, or vice versa. Further, the speed change and steering output members 120 and 114 are now easily designed and assembled, simplified in structure and improved in function. In addition, both the speed change and steering mechanisms 124 and 118 are arranged around the axis of the steering input shaft 87 so as to provide a highly compacted and functional assembly that will improve the vehicle in its running properties and its steerability.

BEST MODES OF CARRYING OUT THE INVENTION

Figure 1:
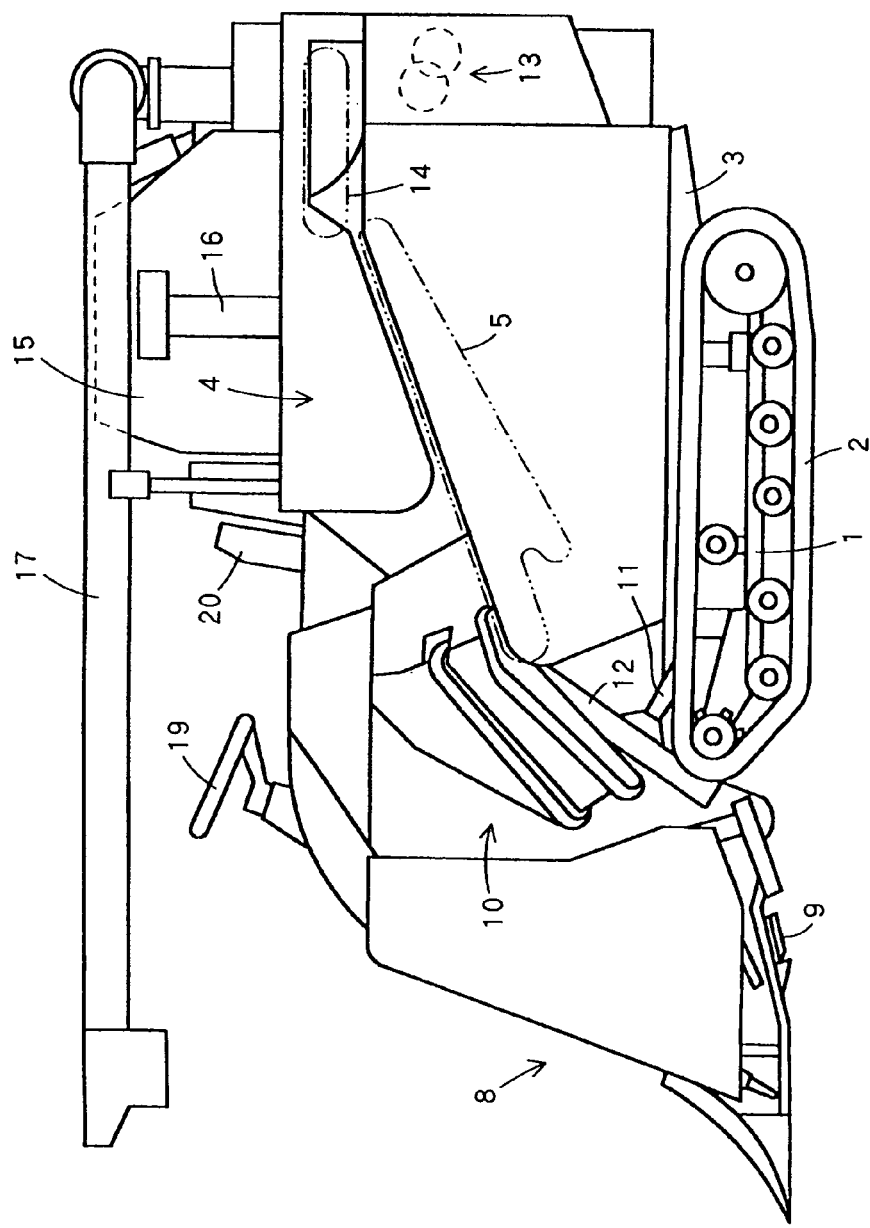
FIG. 1 is a side elevation of a combine shown in its entirety.
Figure 2:
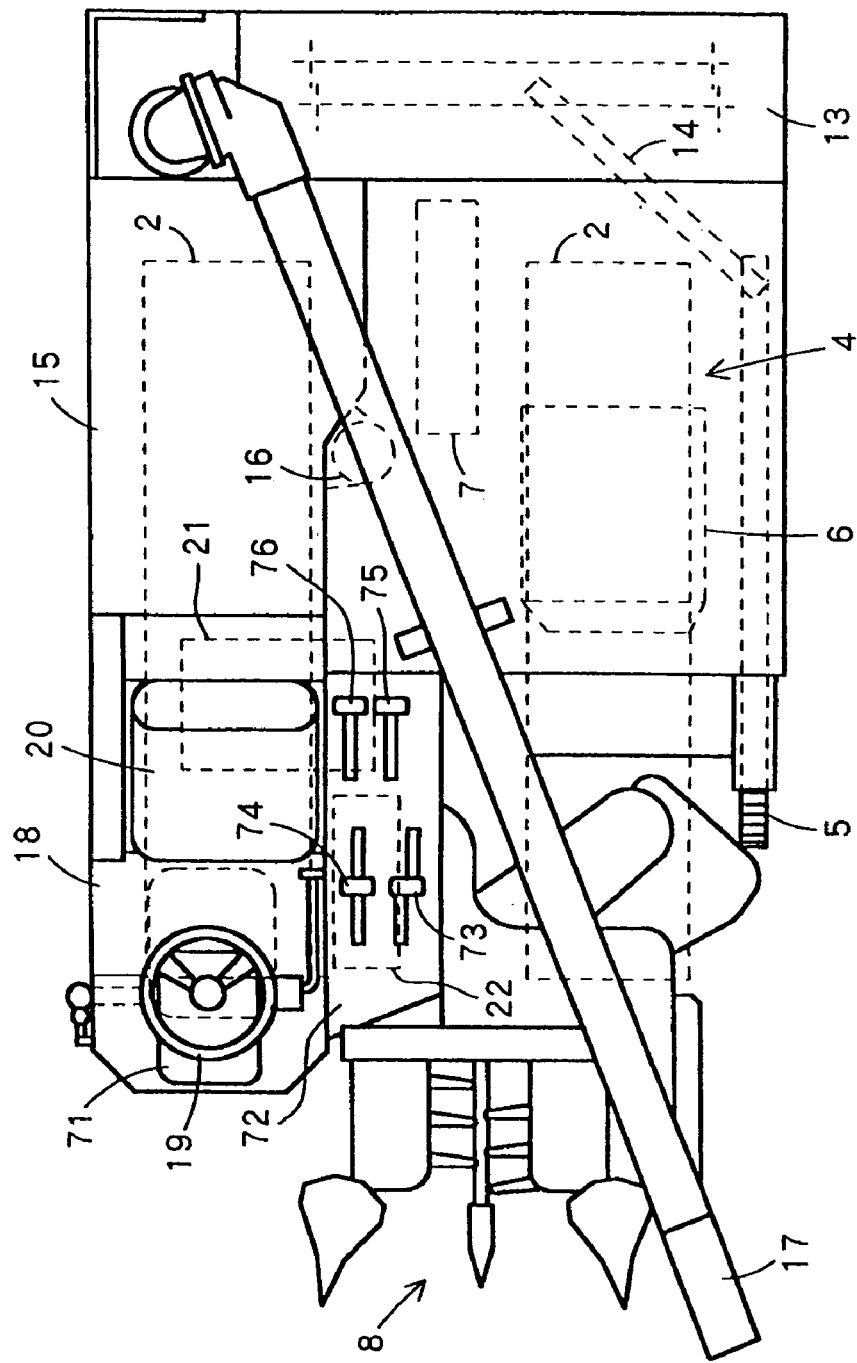
FIG. 2 is a plan view of the combine also shown in its entirety.

Now some embodiments of the invention will be described in detail referring to the drawings. FIG. 1 is an overall side elevation of a combine and FIG. 2 is a plan view thereof, wherein the reference numeral 1 denotes a truck frame supporting a pair of right- and left-side crawlers 2. A chassis 3 is mounted on the frame 1. A threshing section 4 comprises a feed chain spanned along the left side of the combine, and a threshing drum 6 and a treatment drum 7 incorporated in said part. A reaping section 8 comprises a reaping blade 9 and a stalks-conveying assembly 10. The reference numeral 11 denotes an oil-hydraulic cylinder for lifting and lowering the reaping section 8, through a reaper frame, with the further numeral 13 denoting a waste stalks disposal section located to face the end of a waste stalks chain 14. A crops tank 15 continuously receives crops conveyed thereto through a crops lift 16. A discharging auger 17 discharges the crops from the tank 15 and out of the combine. The numeral 18 denotes an operator's station where a round steering handle (wheel) 19 and an operator's seat 20 are disposed. An engine 21 is located below the operator's seat 20. This combine is constructed so that grain stalks are continuously reaped and then threshed.

Figure 3:
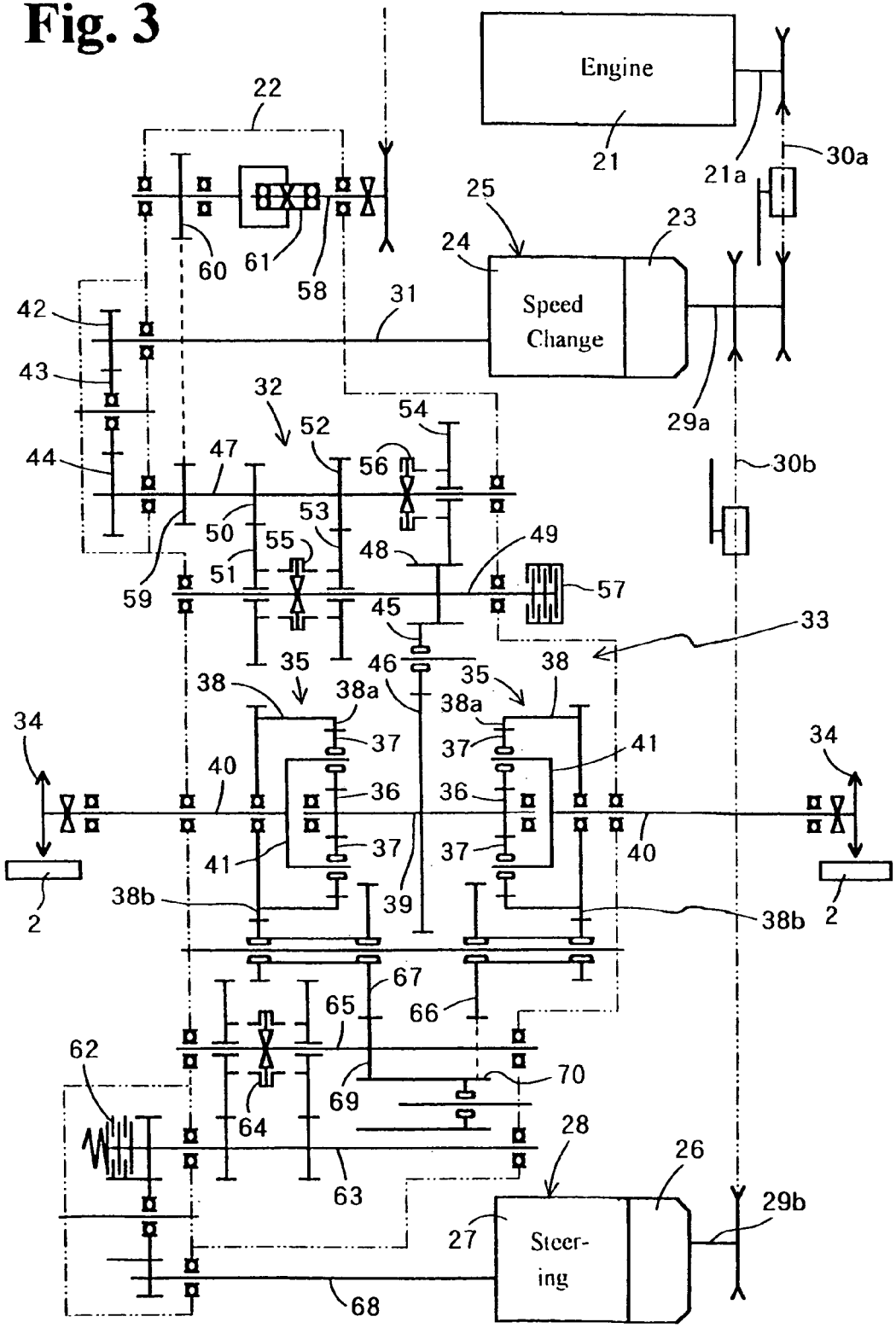
FIG. 3 is a scheme of a transmission of the combine.

As shown in FIG. 3, incorporated in a transmission case 22 driving the crawlers 2 are a pair of first oil-hydraulic pump 23 and first oil-hydraulic motor 24 that constitute a main travel speed change apparatus 25. This apparatus is thus of an oil-hydraulic and step-less type. Further incorporated in said case 22 are a pair of second oil-hydraulic pump 26 and second oil-hydraulic motor 27 that constitute a steering apparatus also of an oil-hydraulic and step-less type. An output shaft 21a from the engine 21 is connected by transmission belts 30a and 30b to respective input shafts 29a and 29b of the first and second hydraulic pumps 23 and 26, respectively, so as to drive them.

A subsidiary speed change mechanism 32 and a differential mechanism 33 do operatively connect an output shat 31 of the first hydraulic motor 24 to respective wheels 34 driving the crawlers 2. The differential mechanism 33 comprises a pair of right- and left-side planetary gear trains 35 and 35. Each planetary gear train 35 substantially consists of a sun gear 36, a group of three planetary gears 37 in mesh with outer periphery of the sun gear 36, a ring gear 38 that stands in turn in mesh with the planetary gears 37.

Those planetary gears 37 are rotatingly held on a carrier 41 whose shaft 40 is aligned with the shaft 39 of the sun gear. The right- and left-side carriers 41 face one another, with the sun gears 36 intervening between them. Each ring gear 38 having inner peripheral teeth 38a in mesh with the planetary gears 37 is disposed coaxial with the sun gear shaft 39. Each ring gear 38 is journaled on and freely rotatable about the carrier shaft 40, that extends outwards to form an axle for supporting and driving the drive wheel 34.

The hydraulic step-less speed changer 25 comprises an inclined rotary plate installed in the first oil-hydraulic pump 23. This plate can be controlled to alter its angle of inclination so that the first hydraulic motor 24 can be driven selectively in one of normal and reversed directions and also at any selected speed. A torque from the first motor 24 will be transmitted at first to a gear 42 fixed on the output shaft 31. The torque is then transmitted through further gears 43, 44 and 45 and the subsidiary speed change mechanism 32 to a central gear 46 fixed on the sun gear shaft 39, thereby driving the sun gear 36. The subsidiary speed changer 32 has a subsidiary speed change shaft 47 on which the gear 44 is fixed and a parking brake shaft 49. This shaft 49 carries a gear 48 fixed thereon and indirectly engaging with the central gear 46 via the gear 45 described above. A couple of gears 50 and 51 respectively born on the subsidiary shaft 47 and braking shaft 49 are for a range of low speeds. A further couple of gears 52 and 53 on those shafts 47 and 49 are for a range of intermediate speeds, with a still further couple of a gear 54 and the above-mentioned gear 48 being for a range of high speeds. Either a slider 55 for lower speeds or another slider 56 for higher speeds will be operated to take any selected position giving a desired speed between the lowest and highest speeds. There is provided a neutral zone between the low speed range and the intermediate speed range, and another neutral zone between the intermediate speed range and the high speed range as well. A parking brake 57 is connected to the brake shaft 49. A 'PTO' shaft 58 for transmitting torque to the reaping section 8 is operatively connected to the subsidiary speed change shaft 47, via another couple of gears 59 and 60 and a one-way clutch 61.

As discussed above, power of the first hydraulic motor 24 will be applied to the sun gear shaft 39 through the central gear 46. Torque received by this shaft 39 will then be directed to the right- and left-side carrier shafts 40 through the respective planetary gear trains 35. Those carrier shafts will thus rotate the respective drive wheels 34 for driving the right- and left-side crawlers 2.

The steering apparatus 28 for turning or swiveling the vehicle is also of the oil-hydraulic and step-less type. An inclined rotary plate installed in the second hydraulic pump 26 is controllable to alter its angle of inclination. The second hydraulic motor 27 can thus be driven selectively in one of normal and reversed directions and also at any selected speed. Associated with the hydraulic members are a brake shaft 63 and a clutch shaft 65. An anti-steering brake 62 is connected to the brake shaft, with a steering clutch 64 being fixed on the clutching shaft 65. Outer peripheral teeth 38*b* of the ring gears 38 are always in mesh with right- and left-side input gears 66 and 67, respectively. An output shaft 68 of the second hydraulic motor 27 is operatively connected to the clutch shaft 65 through the brake shaft 63 and the steering clutch 64. This clutch shaft 65 is connected in turn to the right-side input gear 67 through a normal direction gear 69 (rotating only in a normal direction), and also connected to the left-side input gear 66 through the normal-direction gear 69 and a reversed gear 70 (rotating only in a reversed direction). Both the sliders 55 and 56 in the subsidiary speed changer may be shifted to their neutral zones to actuate the brake 62 and to render idle the clutch 64, in one operational state of the vehicle. In the other case wherein either slider in subsidiary speed changer is shifted to its operative position, the brake 62 remains idle and the clutch 64 stands ready for shift into one of its operative positions. Thus, the outer peripheral teeth 38*b* of the right-side ring gear 38 will be given the output from the motor 27 through normal direction gear 69, on one hand. Simultaneously, the outer peripheral teeth 38*b* of the left-side ring gear 38 will be given the output from the motor 27 through normal direction gear 69 and the reversed direction gear 70, on the other hand. If the second oil-hydraulic motor 27 is occasionally brought into normal rotation, then the left-side ring gear 38 will be caused to rotate reversedly, with the right-side one 38 being caused to rotate normally at the same speed as the former gear. If contrarily that motor 27 is brought into reversed rotation, then the left-side ring gear 38 will be driven normally, with the right-side one 38 rotating reversedly also at the same speed.

However, the second motor 27 for turning the vehicle may be held not operative in any direction so that both the right- and left-side ring gears 38 remain stationary. In this case, the first oil-hydraulic motor 24 for driving the vehicle will operate as follows. Torque output from this motor 24 will be led to the central gear 46 so as to drive both the right- and left-side sun gears 36 to spin in harmony at the same speed. Consequently, the planetary gears 37 and carriers 41 in the right- and left-side planetary gear trains 35 will transmit torque to the right- and left-side crawlers 2 to rotate at the same speed and in the same direction, causing the vehicle to straightly advance forwards or backwards. In another case wherein the first hydraulic motor 24 for driving the vehicle to travel is switched off to render inoperative the right and left sun gears 36, the second motor 27 for turning the vehicle may be switched on to activate the planetary gear trains 35 in opposite directions. If the left-side gear train is driven in normal direction, with the right-side one reversed, then right- and left-side crawlers 2 will rotate in such opposite directions as causing the vehicle to spin 'anti-clockwise'. If contrarily the left-side gear train is driven in reversed direction, with the right-side one in normal direction, then those crawlers 2 will rotate also in opposite directions but causing the vehicle to spin 'clockwise'. In still another case wherein both the first and second oil-hydraulic motors 24 and 27 concurrently operate, respectively causing travel and turn of the vehicle, it will curve itself leftwards or rightwards. Radius of such a curved locus in this case depends upon rotational speed of the second oil-hydraulic motor 27.

As shown in FIGS. 2 and 4 to 13, a steering column 71 disposed in the operator station 18 stands upright from a frontal end thereof. The steering wheel 19 located above this column 71 is capable of operated to rotate about a vertical axis. A side column 72 overlying the transmission 22 is mounted leftwards and beside the operator station 18. A main speed change lever 73, a subsidiary speed change lever 74, a reaping clutch lever 75 and a threshing clutch lever 76 are operatively attached to the side column 72. The steering column 71 consists of split and vertical halves that are made each by processing an aluminum alloy cast. Those halves are consolidated together using bolts 77 to give the steering column a box-like appearance.

A tilt base 78 is formed integral with an upper end portion of the steering column 71. Tilt brackets 80 connected by pivot bolts 79 to the tilt base 78 are capable of angular displacement relative thereto. A tilt lever 81 serves to set the tilt brackets 80 at any desired angular position. A tubular casing 82 extending upwardly from a top cover 83 of the column 71 has a lower end secured to the tilt brackets 80. An upper steering shaft 84 rotatingly supported in the tubular casing 82 has an upper end to which the steering wheel 19 is attached. By operation of the tilt lever 81, the steering wheel 19 can be tilted fore and aft when adjusting and fixing position thereof to be convenient to a driver.

A lower steering shaft 86 has an upper end connected by a universal joint 85 to a lower end of the upper steering shaft 84. The lower steering shaft 86 and an upper end of the steering input shaft 87 are rotatingly supported in the upper end portion of the steering column 71. A gear 88 fixed on the lower steering shaft 86 is in mesh with a sector gear 89 fixed on the steering input shaft 87, so that these shafts 86 and 87 are always in an operative engagement with each other. The steering input shaft 87 accommodated in the steering column 71 does stand generally upright therein and extend almost coaxially with this column.

A bearing member 90 that is located in the left-hand half of the steering column 71 is removably attached to a middle height thereof. Bearings 92 fitted in this member 90 support in a cantilever fashion an end of the speed change input shaft 91. This shaft 91 is thus extends generally transversely and horizontally to rotate relative to the bearing member. A further universal joint 93 connects a lower end of the steering input shaft 87 to the upper end of a fulcrum shaft 94 to which a steering input member 95 is fixed. The speed change input shaft 91 holds this steering input member 95 to be rotatable therein and relative thereto. An input connector 96 is removably attached to the steering input member 95, with set-screws 97 serving to fix position of the former 96 relative to the latter 95. A further bearing 95a enables the speed change input shaft 91 to support thereon the steering input member 95, allowing same to rotate around the steering input shaft 87. Forward or reverse rotation of this steering input shaft 87 will cause the input member 95 to rotate in a forward or reverse direction around the generally vertical axis of said input shaft 87. Forward or reverse rotation of the speed change input shaft 91 will cause both the fulcrum shaft 94 and steering input member 95 to tilt forwards or backwards around the generally horizontal and transverse axis of said input shaft 91. The universal joint 93 described above is located at a position where the vertical axis of the steering input shaft 87 intersects at a right angle the horizontal axis of the sped change input shaft 91. Thus, as the steering wheel 19 is operated to rotate the steering input shaft 87 clockwise or anti-clockwise, both the steering input member 95 and the input connector 96 will rotate in unison and clockwise or anti-clockwise.

Figure 4:
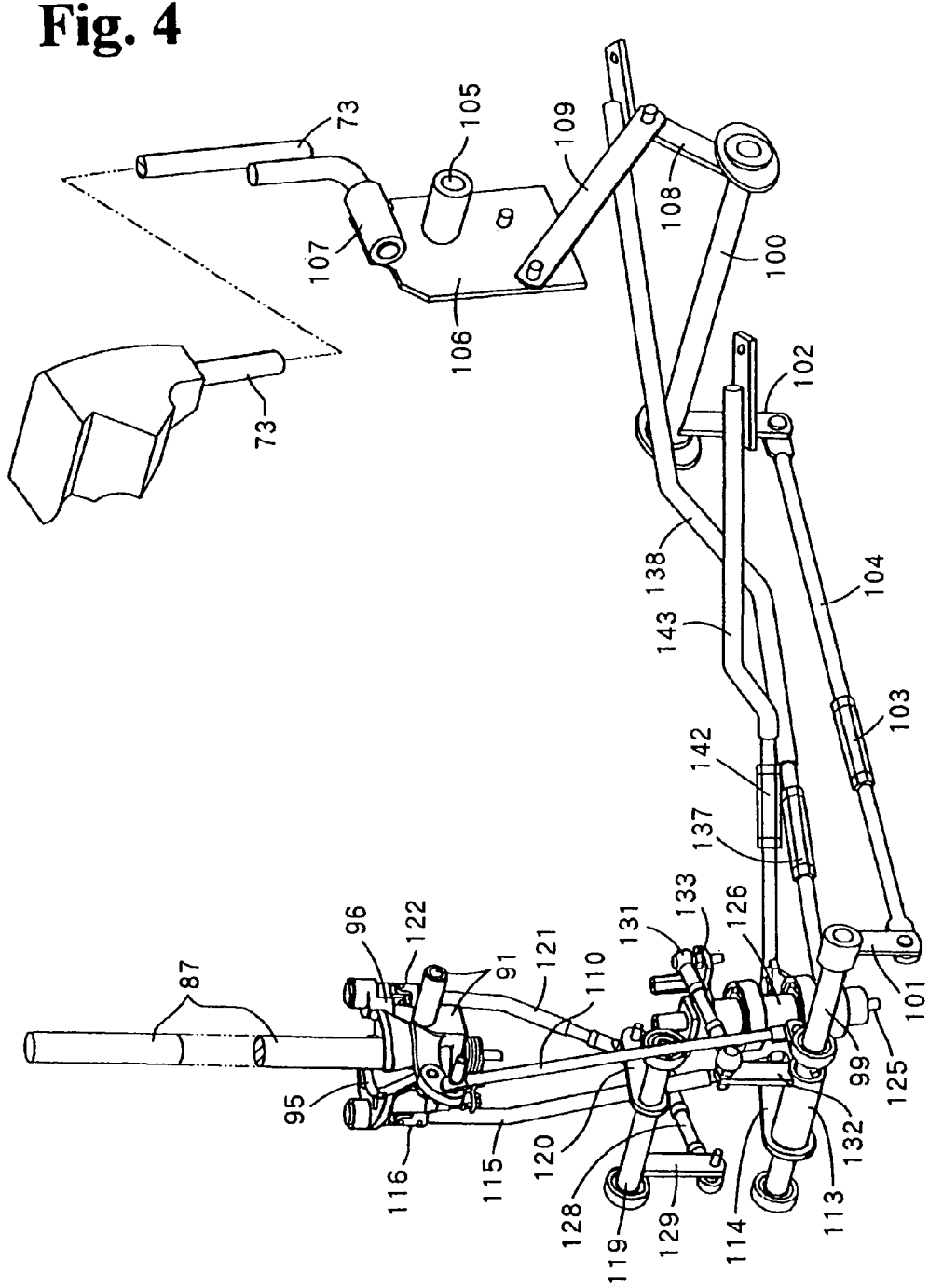
FIG. 4 is a perspective view of a system for operating a speed changing mechanism in connection with a steering mechanism.
Figure 5:
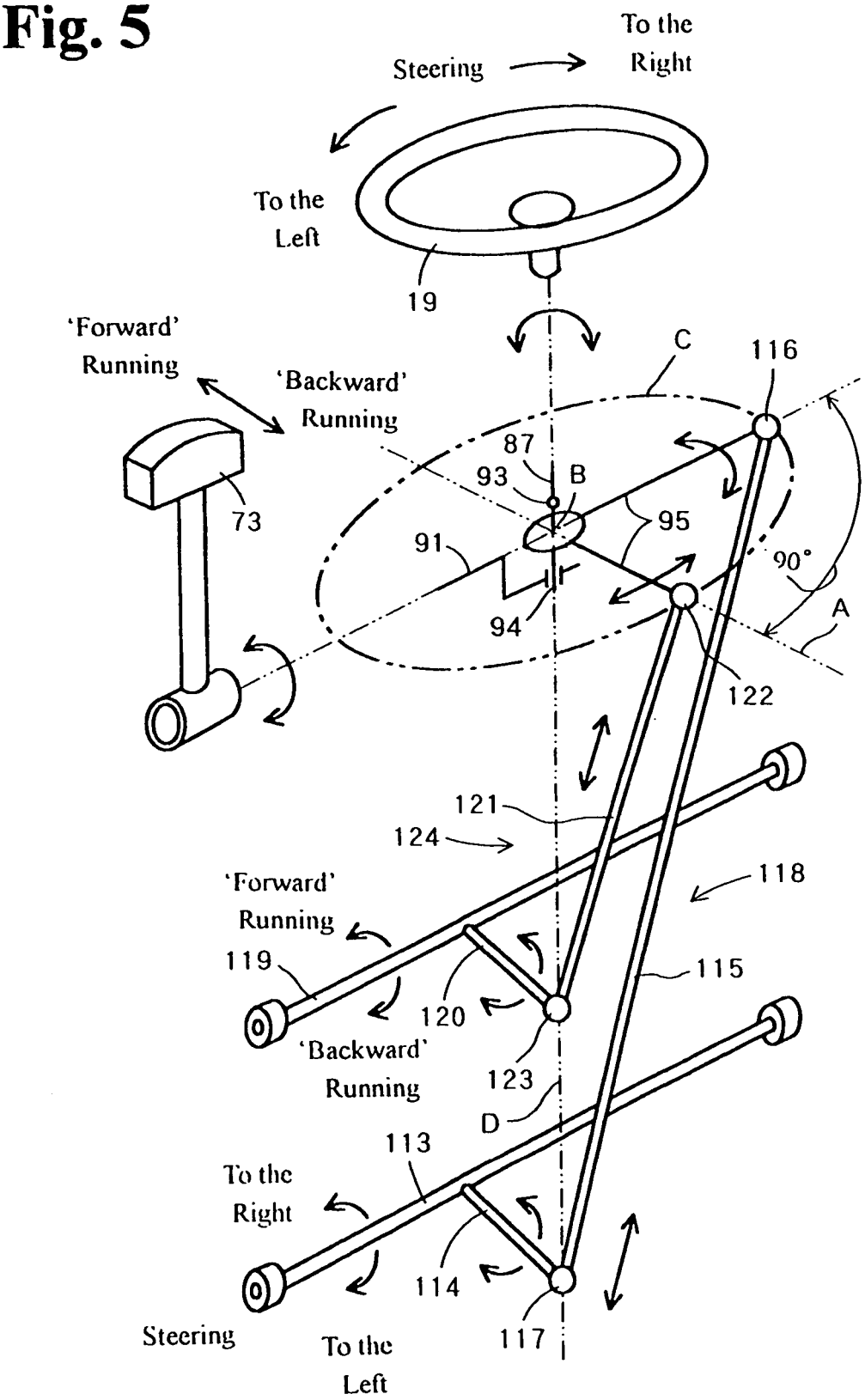
FIG. 5 is a scheme of operation of the mechanisms.
Figure 6:
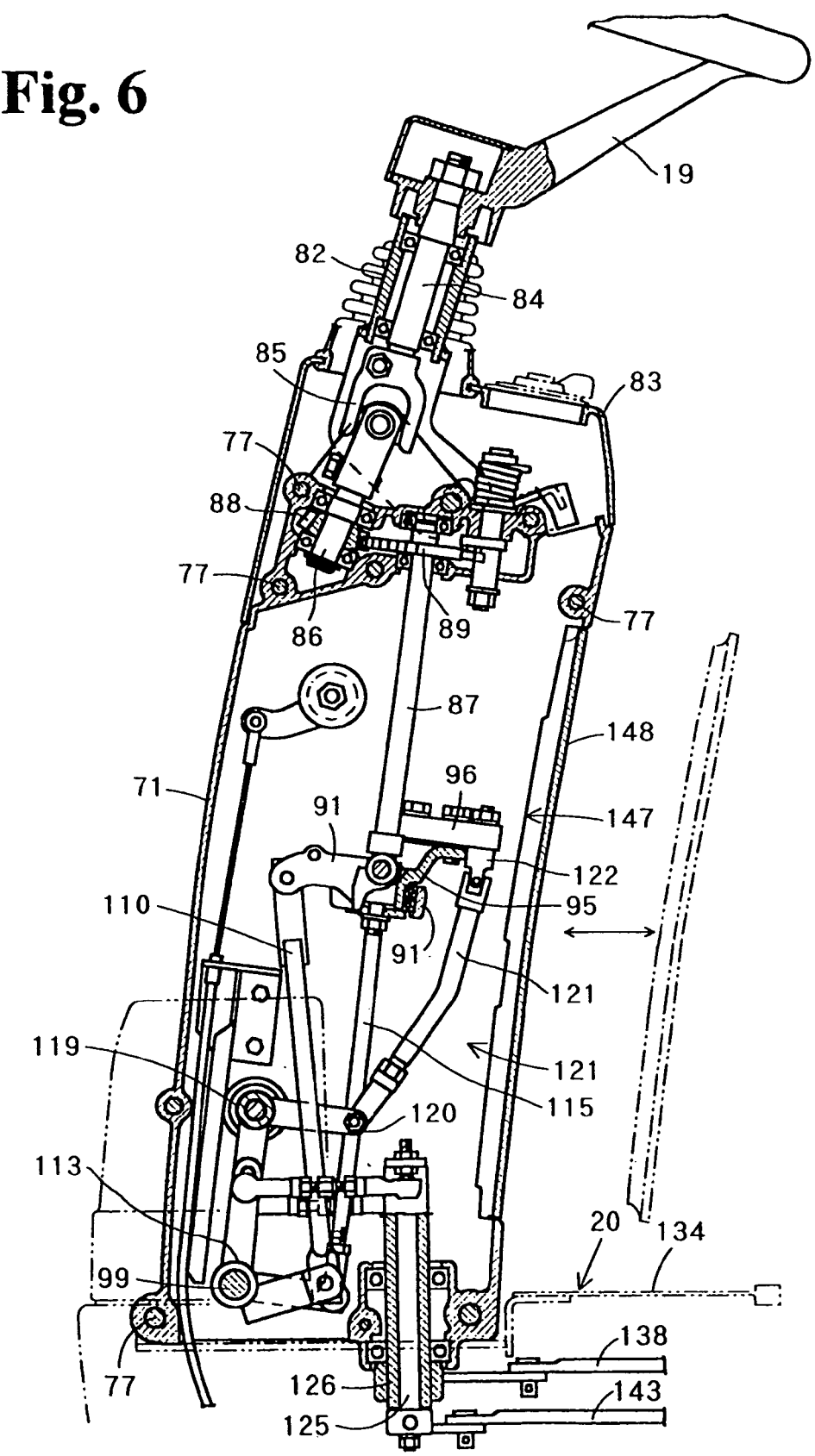
FIG. 6 is a side elevation of a steering column.
Figure 7:
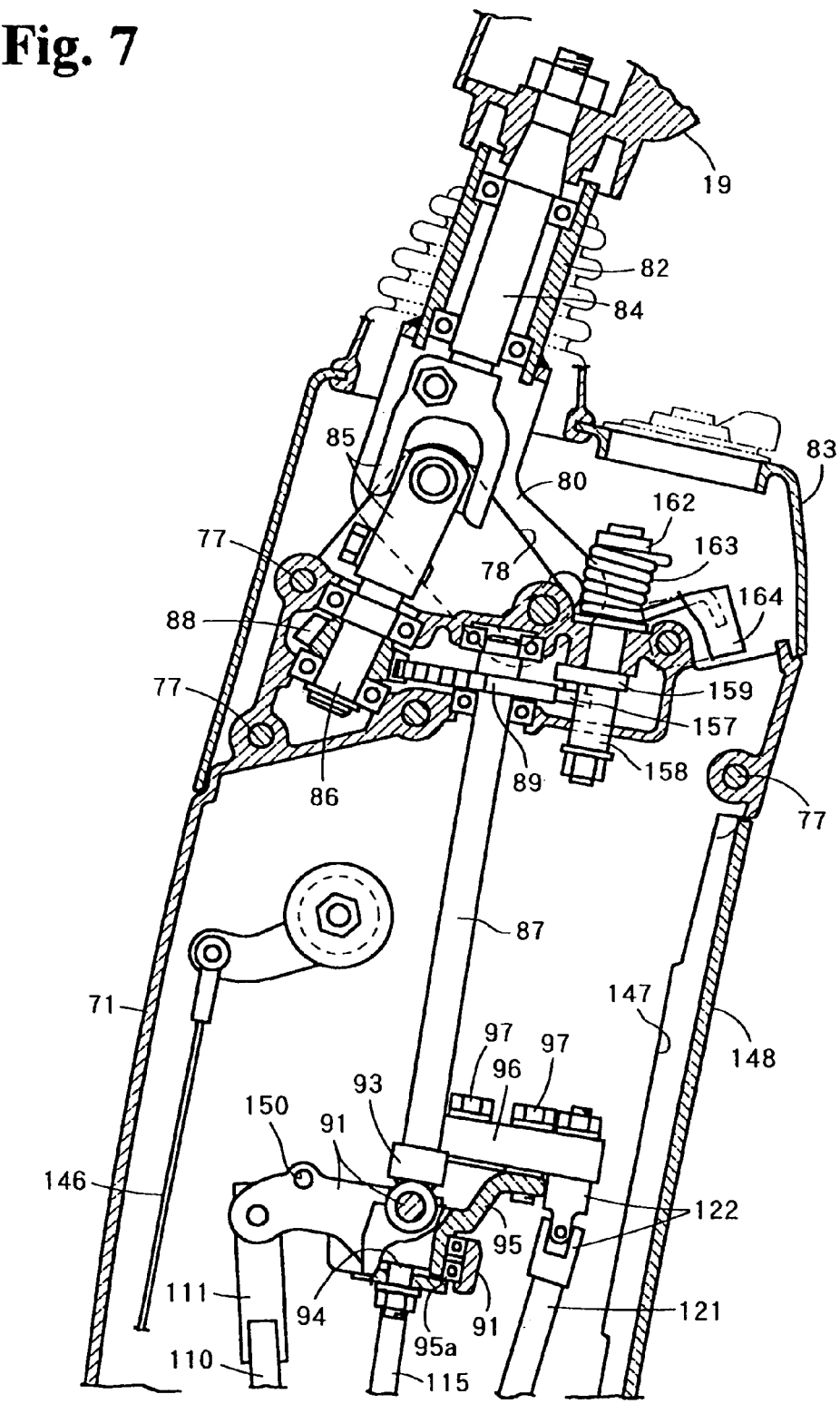
FIG. 7 is an enlarged side elevation of an upper part of the column.
Figure 8:
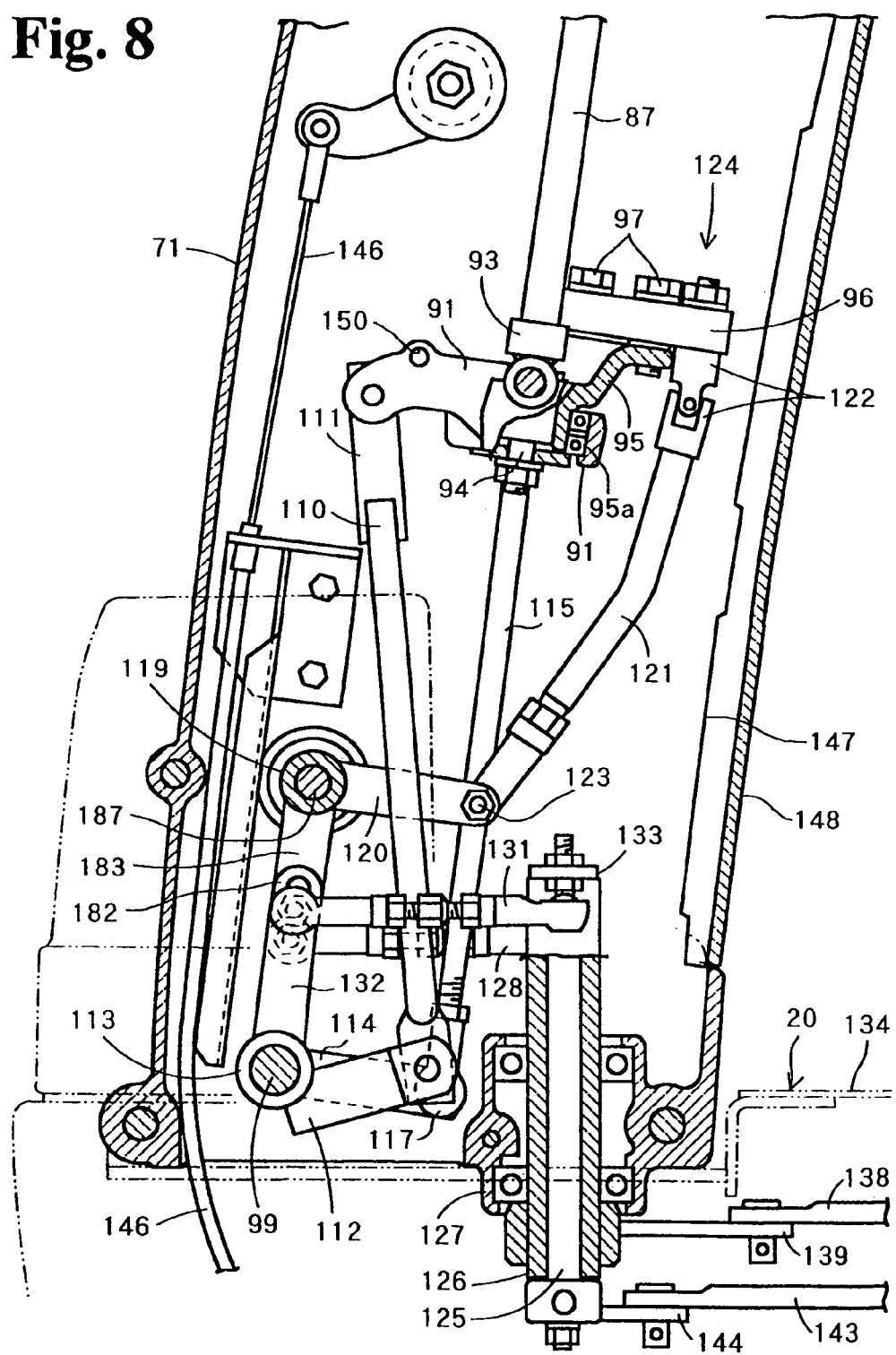
FIG. 8 is an enlarged side elevation of a lower part of the column.
Figure 9:
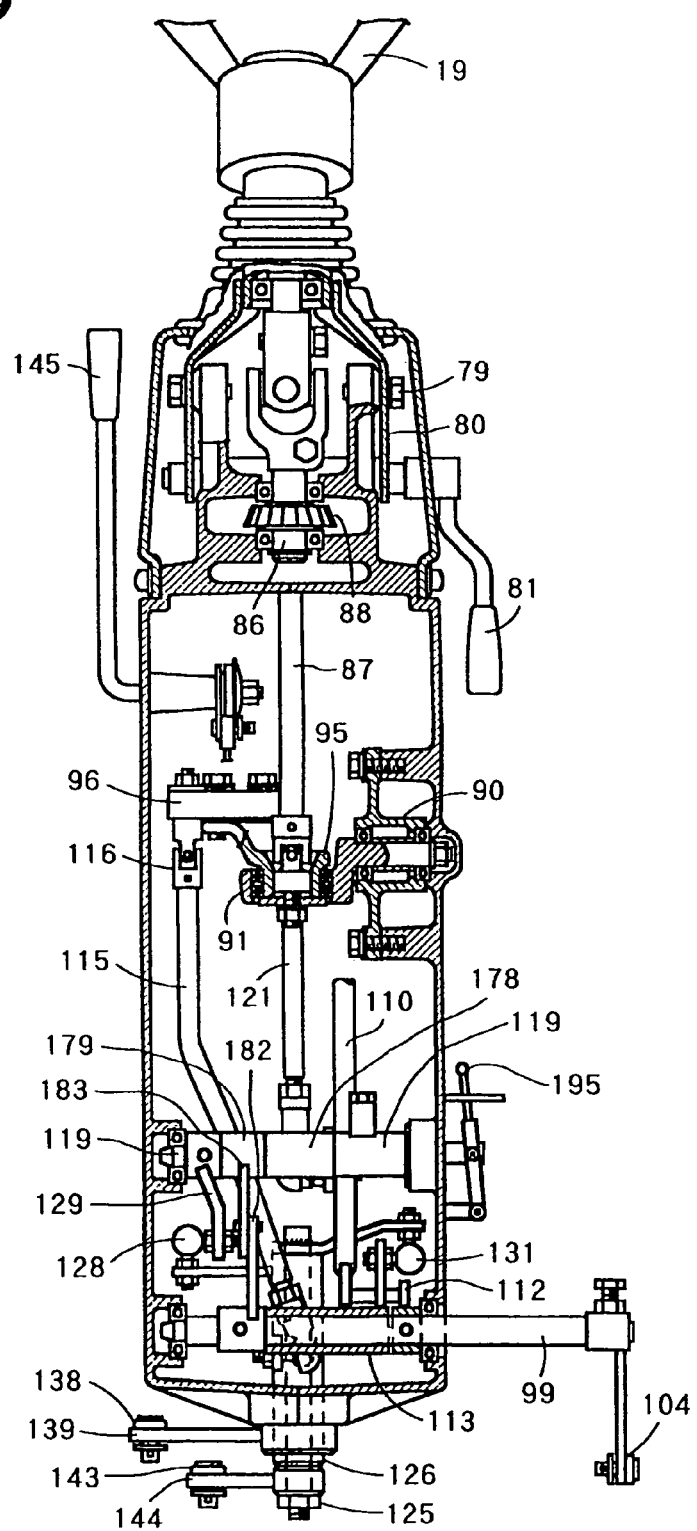
FIG. 9 is a front elevation of the steering column.
Figure 10:
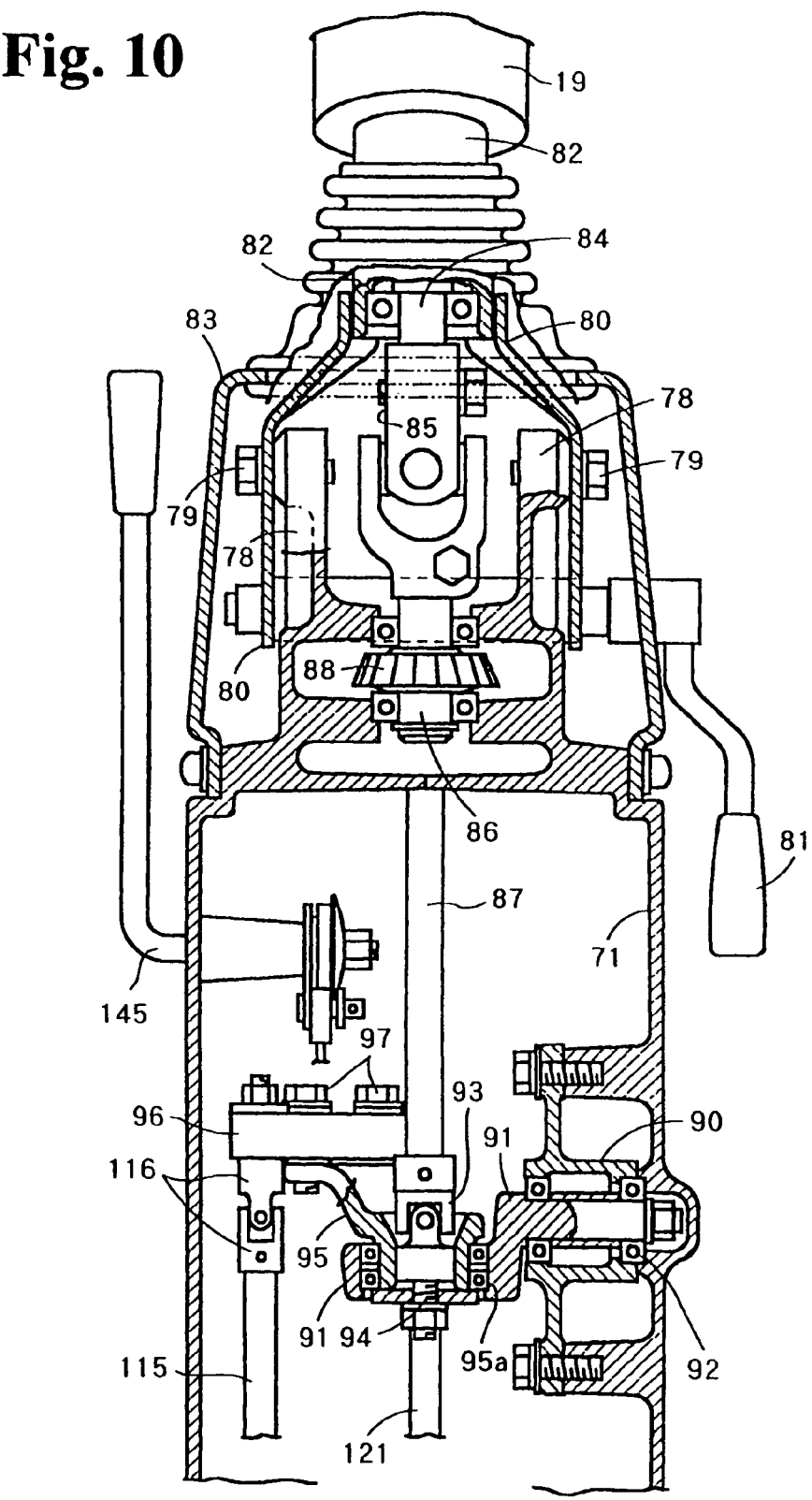
FIG. 10 is an enlarged front elevation of an upper part of the column.

A main speed change shaft 99 is supported in a lower forward region in the steering column 71 so as to be rotatable therein. This main speed change shaft 99 that is generally horizontal and transverse has a left-hand end protruding leftwards and outwardly from the left side wall of the steering column 71. Links 101 and 102 and a rod 104 having a turn buckle 103 for length adjustment thereof do connect an interconnect shaft 100 to the main speed change shaft 99. This interconnect shaft 100 is rotatably supported on the chassis 3 beneath the side column 72. As shown in FIG. 4, a fulcrum plate 106 has a fulcrum shaft 105 also rotatably supported by the chassis 3. A cylindrical shaft 107 fixed on the fulcrum plate 106 fits on the basal end of the main speed change lever 73, allowing same to rock sideways. Further links 108 and 109 connect this fulcrum plate 106 to the interconnect shaft 100, so that as the main speed change lever 73 rocks fore and aft around the fulcrum shaft 105, the main speed change shaft 99 will rotate forwards or reversedly to thereby effect main speed change operation. On the other hand, the speed change input shaft 91 is connected to the main speed change shaft 99 through a tie-rod 110, an upper plate 111 and a lower link 112. Therefore, as the main speed change lever 73 operates the main speed change shaft 99 to rotate forwards or reversedly, the steering input member 95 will tilt fore and aft about the axis of the speed change input shaft 91.

A steering output shaft 113 of a cylindrical shape rotatingly fits on the main speed change shaft 99, with a link-shaped steering output member 114 fixed on the output shaft 113. A rod-shaped steering link 115 has its upper end connected by a universal joint-shaped member 116 to the input connector 96, and its lower end similarly connected by a ball joint-shaped member 117 to the steering output member 114. A steering mechanism 118 constructed in this manner will function when the vehicle is steered to change or adjust its running course.

A speed change output shaft 119 located above and in parallel with the steering output shaft 113 is also incorporated rotatably in the steering column 71, with a link-shaped speed change output member 120 fixed on the output shaft 119. A rod-shaped speed change link 121 has its upper end connected by a universal joint-shaped member 122 to the input connector 96, and its lower end similarly connected by a ball joint-shaped member 123 to the speed change output member 120. A change speed mechanism 124 constructed in this manner will function when the vehicle is accelerated or decelerated or switched over from forward travel to rearward travel, or vice versa.

A double cylinder assembly that consists of an inner steering maneuver shaft 125 and an outer speed change maneuver shaft 126 hollow and rotating relative thereto is disposed in a lower and rear portion of the steering column 71. A bearing assembly 127 holding the double cylinder assembly in place and allowing it to rotate is located intermediate a left and right lateral sides of said column 71. The speed change output shaft 119 is connected to an upper end of the speed change maneuver shaft 126, through speed change links 129 and 130 having their ends connected by ball joints to a common variable length rod 128. The steering output shaft 113 is likewise connected to an upper end of the steering change maneuver shaft 125, through steering links 132 and 133 having their ends connected by ball joints to another common variable length rod 131.

Both the maneuver shafts 125 and 126 extending coaxially with each other stand upright on the bottom of the steering column 71. Upper portions of those shafts 125 and 126 are disposed in said column and operatively connected to the speed change output shaft 113 and steering output shaft 119. Lower ends of those maneuver shafts 125 and 126 protrude down from the column's 71 bottom so as to extend below an operator step 134 for the operator seat 20. An output control shaft 135 of the speed change apparatus 25 is fixed on one end of a control arm 136. The other end of this speed change control arm 136 is connected to the lower end of the speed change maneuver shaft 126, by a link 139 and an adjustable length rod 138 having a turn buckle 137 integral therewith. With the output shaft 135 being rotated forward or backward, the inclined rotary plate in the first hydraulic pump 23 will thus be changed in its angle. The first hydraulic motor 24 controlled in this way with respect to its rotational speed and direction, forward or backward, will function to accelerate or decelerate the vehicle in a step-less manner and also to alter its travel direction from forward to backward, or vice versa. Similarly, an output control shaft 140 of the steering apparatus 28 is fixed on one end of a steering control arm 141. The other end of this steering control arm 141 is connected to the lower end of the steering maneuver shaft 125, by a link 144 and an adjustable length rod 143 having a built-in turn buckle 142. With the output shaft 140 being rotated forward or backward, the inclined rotary plate in the second hydraulic pump 26 will thus be changed in its inclination angle. The second hydraulic motor 27 controlled in this way with respect to its rotational speed and direction, forward or backward, will function to the steered angle of the vehicle also in a step-less manner and also to alter its turning direction from clockwise to anti-clockwise, or vice versa.

An acceleration lever 145 pivoted on a right side wall of the steering column 71 protrudes outwards to be caused to swivel fore and aft. An acceleration wire 146 connecting this lever 145 to the engine 21 extends inside and along the frontal face of said column and protrudes down from its base. This structure enables the acceleration lever 145 to manually control rotational speed of the engine. A maintenance hand-hole 147 opened in the rear wall of the steering column 71 is normally closed with a removable lid 148.

It will now be apparent that actual degree of operating the steering mechanism 118 depends proportionally upon actual extent to which the speed change mechanism 124 is operated. This means that any acceleration of the vehicle will automatically increase more or less a steering factor or ratio, whereas deceleration will decrease it. Thus, any given angle of the steering wheel 19 will give almost the same turning radius, that is intrinsic to that angle and irrespective of actual speed of the vehicle advancing at that time. The vehicle can now easily change its travel speed and readily adjust its advancing path into parallel with any desired row of crops or the like. By virtue of the reversed-conical configuration of the speed change and steering mechanisms 124 and 118, any steering operation will rotate the input shaft 87 to actuate the steering input member 95, resulting in deceleration of the vehicle synchronously with the steered motion thereof. Any speed-changing operation will rotate the other input shaft 91 to also actuate the same steering input member 95, thereby enabling any speed change to increase or decrease the turning radius. If however the neutral position is taken during such speed-changing operation, then the turning power will be interrupted not to applied to the vehicle.

The steering joint member 116 connecting the input member 95 to the steering link 115 is aligned with the speed change input shaft 91. Speed change joint member 122 connecting the other input member 96 to the speed change link 121 is aligned with a line 'A' intersecting the axis of speed change input shaft 91. This structure renders easier the determination of relative motion of the speed change input member 95 rotating around and relative to the steering and speed change input shafts 87 and 91, whereby design, assembly and structure of these members are simplified and motion thereof is rendered more reliable. Further, there is formed an imaginary circle 'C' having a center 'B' at which the axes of those speed change and steering input shafts 91 and 87 intersect one another. The speed change and steering joint members 122 and 116 are arranged on this circle 'C' so that the steering input member 95 and the like are more simplified and compacted. Arranged on the axis of the steering input shaft 87 is the ball joint-shaped member 123 connecting the speed change output member 120 and link 121 to each other, on one hand. Also arranged on said axis of the shaft 87 is the other ball joint-shaped member 117 connecting the steering output member 114 and link 115 to each other, on the other hand. Thanks to this feature, the so-called 'reversed steering' phenomenon will not occur when the vehicle is changed over from forward travel to backward travel, or vice versa. Design, assembly and structure of the speed change and steering output members 120 and 114 are further simplified and motion thereof is rendered more reliable. A distance measured between the point 'B' of mutual intersection of inputs shafts 91 and 87 and the ball joint-shaped member 123 does remarkably differ herein from another distance measured between the point 'B' and the other ball joint-shaped member 117. Thus, those joint members 123 and 117 are spaced noticeably from each other on a common line 'D'. By virtue of this feature, those joint members 117 and 123 are inhibited from interfering one another, scope or range in which they move is designed easier, and those speed change and steering links 121 and 115 can now be installed in a narrower space.

The speed change and steering joint members 116 and 122 are arranged on the circle 'C' having the center 'B' at which the axes of speed change and steering input shafts 91 and 87 intersect one another. These members 116 and 122 are spaced about 90 (ninety) degrees from each other. Thus, revolving motion of the speed change input shaft 91 will not displace the steering joint member 116, whilst displacing the speed change joint member 122 to a maximum extent to accelerate or decelerate the vehicle. Also due to the speed change input shaft 91 disposed in a plane on which the joint members 116 and 122 move, the latter can enjoy a larger area for their movement and the steering input member 95 can be incorporated in a compacted and highly functional manner. Both the steering and speed change joint members 116 and 122 are capable of rotating about an angle of about 90 (ninety) degrees or less around the steering input shaft 87. This feature affording a sufficient range in which each of joint members 116 and 122 moves, is also effective to prevent the so-called 'reversed steering' phenomenon from occurring when the vehicle is changed over from forward travel to backward travel, or vice versa. Dependently upon steered angles which the steering input shaft 87 does command, the speed change joint member 122 will be displaced to decelerate the vehicle so as to assist the vehicle to make a 'spinning turn' around its inside crawler 2. The structure affording this effect is constructed herein in such a fashion that its function is improved despite its compactness. In the spinning turn effected by the differential mechanism 33 in response to an output from the steering apparatus 28, one of the right and left crawlers 2 is driven forwards and the other rearwards. In this mode, the vehicle will swivel about a center that is disposed intermediate the right and left ends and also intermediate the fore and aft ends of said crawlers as a whole. In other words, forward or backward advance takes place simultaneously with the turning motion of the vehicle at a turning radius that is determined on the basis of a ratio of an operated degree of the speed change apparatus 25 to that of the steering apparatus 28. Further, both the speed change output and steering output shafts 119 and 113 located in parallel with the speed change input shaft 91 are accurately supported in and rotate within the column 71, which is composed of discrete segments separable from each other. Since all of these input and output shafts 91, 119 and 113 extend sideways, relative connection between relevant members is facilitated longitudinally of the vehicle. In detail, the main speed change lever 73 is easily connected to the output shaft 119, with the speed change and steering apparatuses 25 and 28 being also connected easily to the corresponding output shafts 113 and 119. In this way, a simpler operative structure as well as an improved maneuverability are afforded herein.

Figure 14:
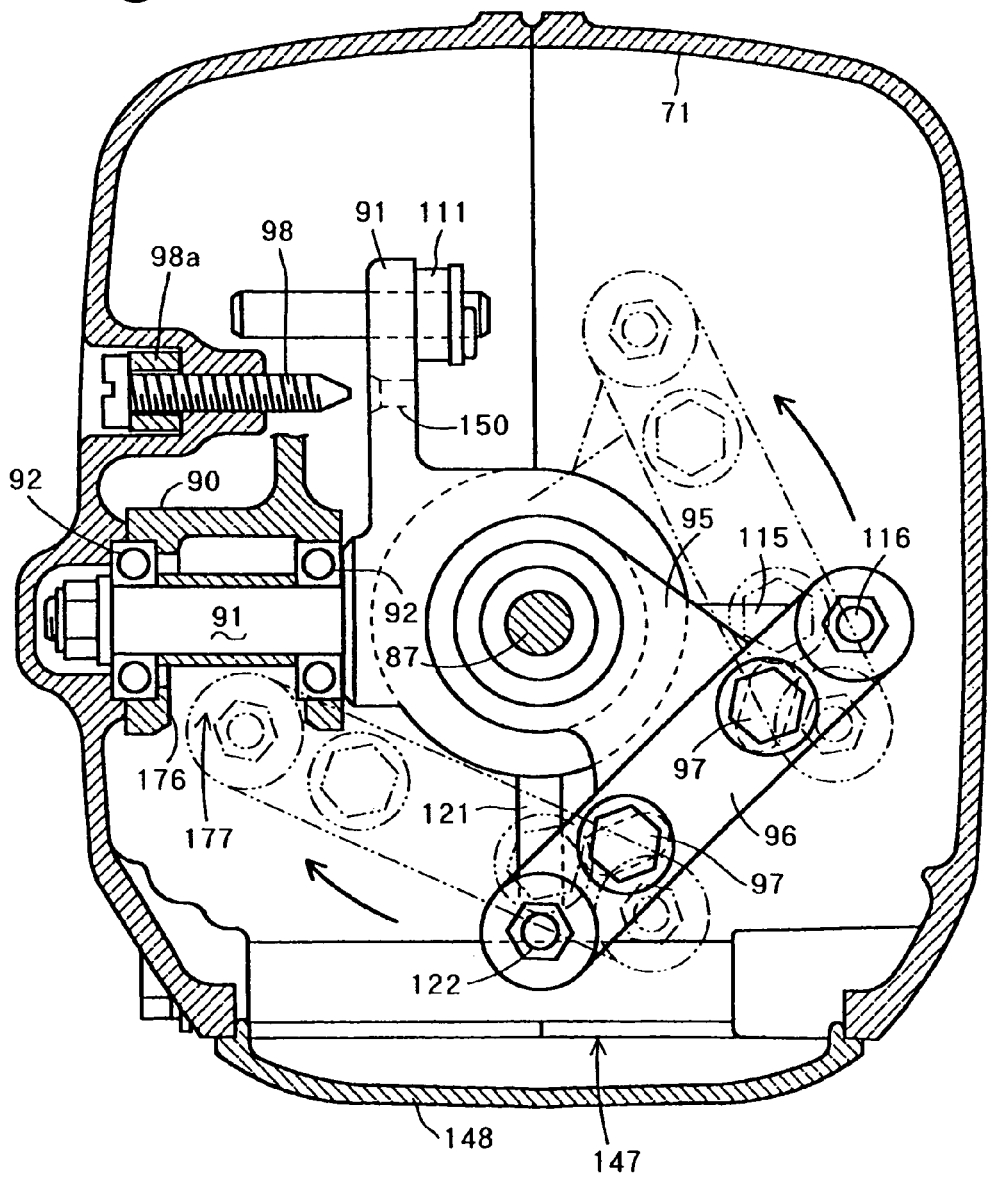
FIG. 14 is a horizontal cross section of the steering column.
Figure 15:
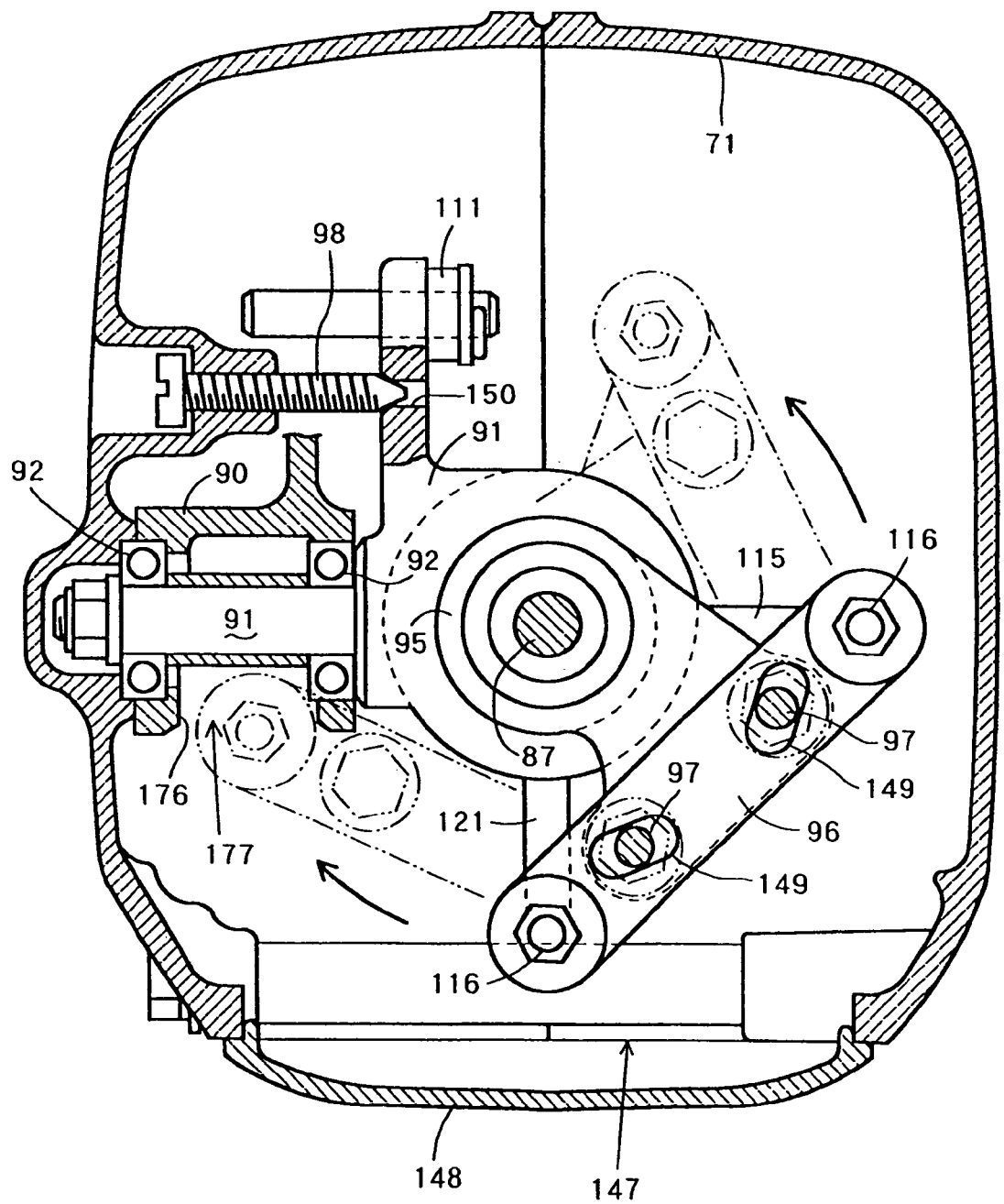
FIG. 15 is a scheme showing a setting operation made in the column.

As will be seen in FIG. 14, the set-screws or linkage bolts 97 are freely fitted in phase-adjusting elongated holes 149, and the latter are formed in the input interconnect member 96. Those elongated holes 149 are arranged on a common circle having a center coincide with the axis of the steering input shaft 87. The speed change input shaft 91 may be kept at its neutral position by means of a bolt-shaped standardizing member 98 engaged with a neutralizing hole 150. In this state, the steering input member 95 can be shifted clockwise or anti-clockwise so as to take a selected position relative to the input shaft 91. In this way, the neutral position in the vehicle's turning motion given by operation of the steering wheel 19 will thus be adjusted, while allowing determination of the neutral position for speed change operation. The bolt-shaped standardizing member 98 for fixing the input shaft 91 at its standard position is detachable, and a bolt stopper 98a shown in FIG. 14 is removable. Thus, it is possible to bring a free end of the standardizing member 98 into the neutralizing hole 150 as shown in FIG. 15, in order to select a desired neutral position for the range of speed change and to select that for the range of steering. Joint nuts 121*a* and 115*a* respectively shown in FIGS. 8 and 11 may be fastened or alternatively loosened so as to alter overall effective length of each of speed change and steering links 121 and 115, facilitating adjustment and other works when assembling the structure.

Figure 16:
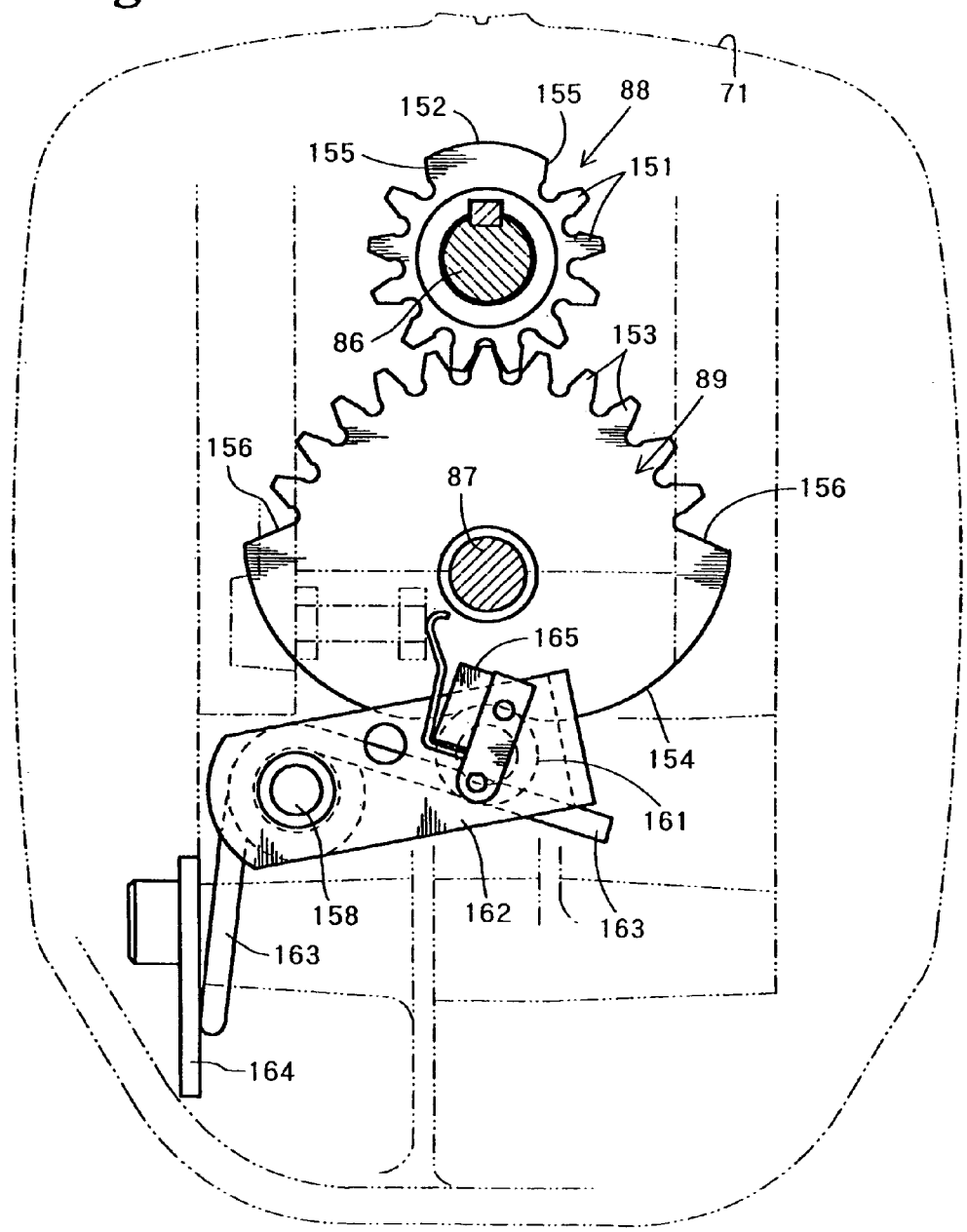
FIG. 16 is a partial plan view of an upper part of the column.
Figure 17:
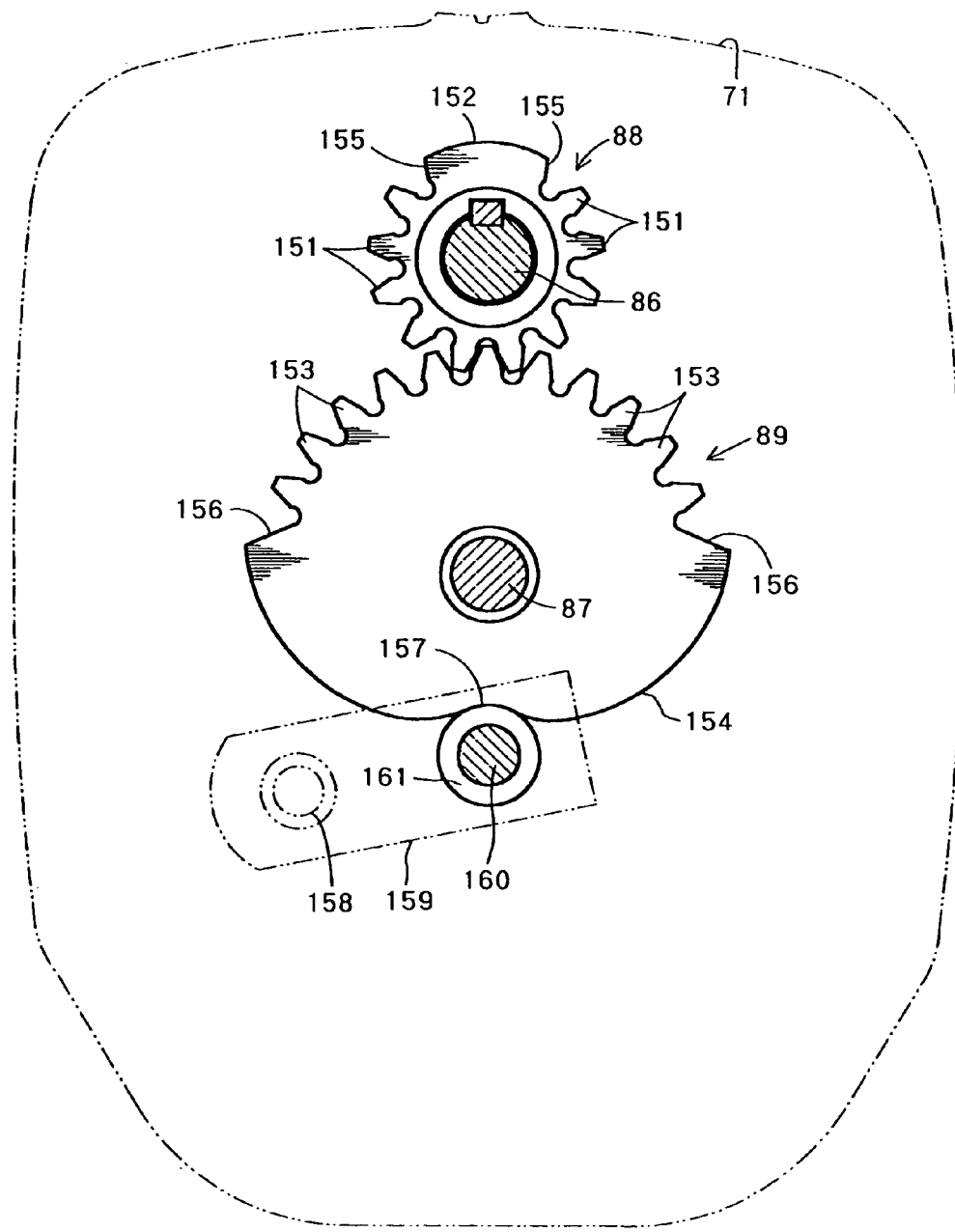
FIG. 17 is another partial plan view.
Figure 18:
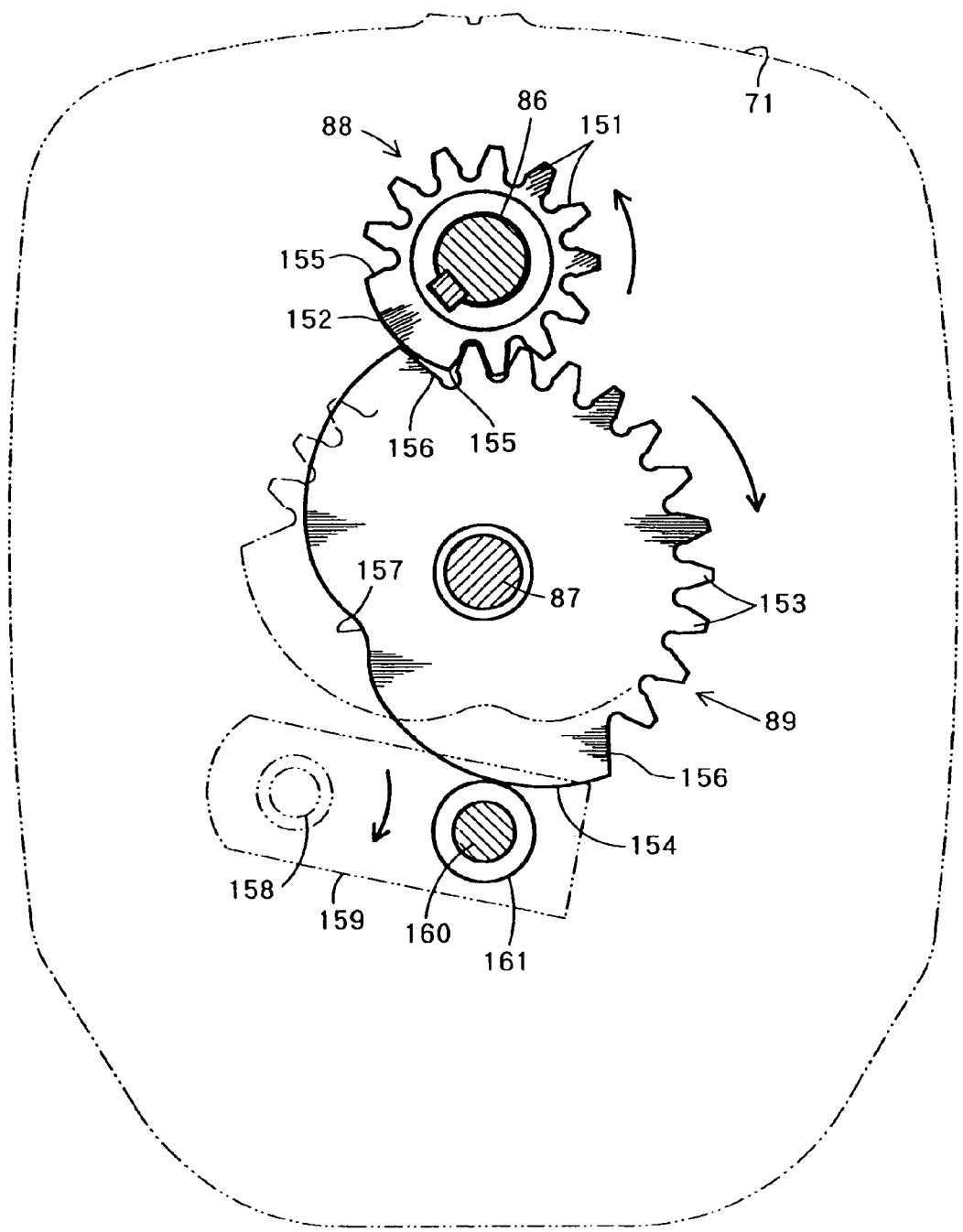
FIG. 18 is a scheme of operation of the part shown in FIG. 16.

As illustrated in FIGS. 16 to 18, the gear 88 has teeth 151 formed in and along its partial periphery ranging over 270 (two hundreds and seventy) degrees, with an arc of 90 (ninety) degrees having no teeth. A maximum overall revolution angle of the steering wheel 19 is thus 270 degrees, that is 135 (hundred and thirty-five) degrees of steering to the right plus 135 degrees to the left. Drivers of this vehicle can operate with their one hand the steering wheel 19. The sector gear 89 has teeth 153 over its peripheral portion of 130 (hundred and thirty) degrees of its periphery, its remainder peripheral portion of 230 (two hundreds and thirty) degrees functioning as an arcuate cam 154. Some teeth 151 of the gear 88 are variably in mesh with some teeth 153 of the sector gear 89. Maximum revolution of those gears 88 and 89 in either direction will cause one or the other of stoppers 155 of the former gear to abut against the corresponding one of the latter's stoppers 156. Revolution angle of the steering wheel 19 is thus delimited, and the steering input member 95 and the input interconnect 96 allowed to rotate 65 (sixty-five) degrees in each of forward and backward directions of revolution. In this way, a space for disposing upper ends of the change speed input shaft 91 and the tie-rod or main speed change member 110 is included in a plane in which the input member 95 rotates. Such a structure further enables arrangement of the steering joint member 116 aligned with the axis of the input shaft 91, on one hand. It also enables arrangement of the input joint members 116 and 122 on one and the same circle but spaced 90 (ninety) degrees from each other, on the other hand, rendering it easier to design and assemble such a compacted structure.

A notch 157 for causing straight advance to the vehicle is formed at a middle region of the arcuate cam 154 which the sector gear 89 comprises. A detent shaft 158 is rotatably held in position in an upper wall of the steering column 71. A detent arm 159 is fixed on a lower portion of the detent shaft, and a detent roller 161 is journaled on a roller shaft 160 secured to the arm 159. The detent roller 161 held in contact with the arucuate cam 154 can disengageably come into engagement with the straight advance notch 157 so as to hold the steering wheel 19 at its neutral position for the vehicle's straight advance. Fixed on the top of the detent shaft 158 is a detent lever 162, on which one end of a neutralizing spring 163 surrounding this shaft 158 does act. The other end of this spring 163 bears against a stopper 164 formed integral with the steering column 71 so that the detent roller 161 urged by said spring is kept in a forced contact with the arcuate cam 154 having the straight advance notch 157. A microswitch 165 fixed on the detent lever 162 and capable of changeover between ON and OFF does serve as an electrical sensor for detecting the straight-advance position of the wheel 19.

Figure 12:
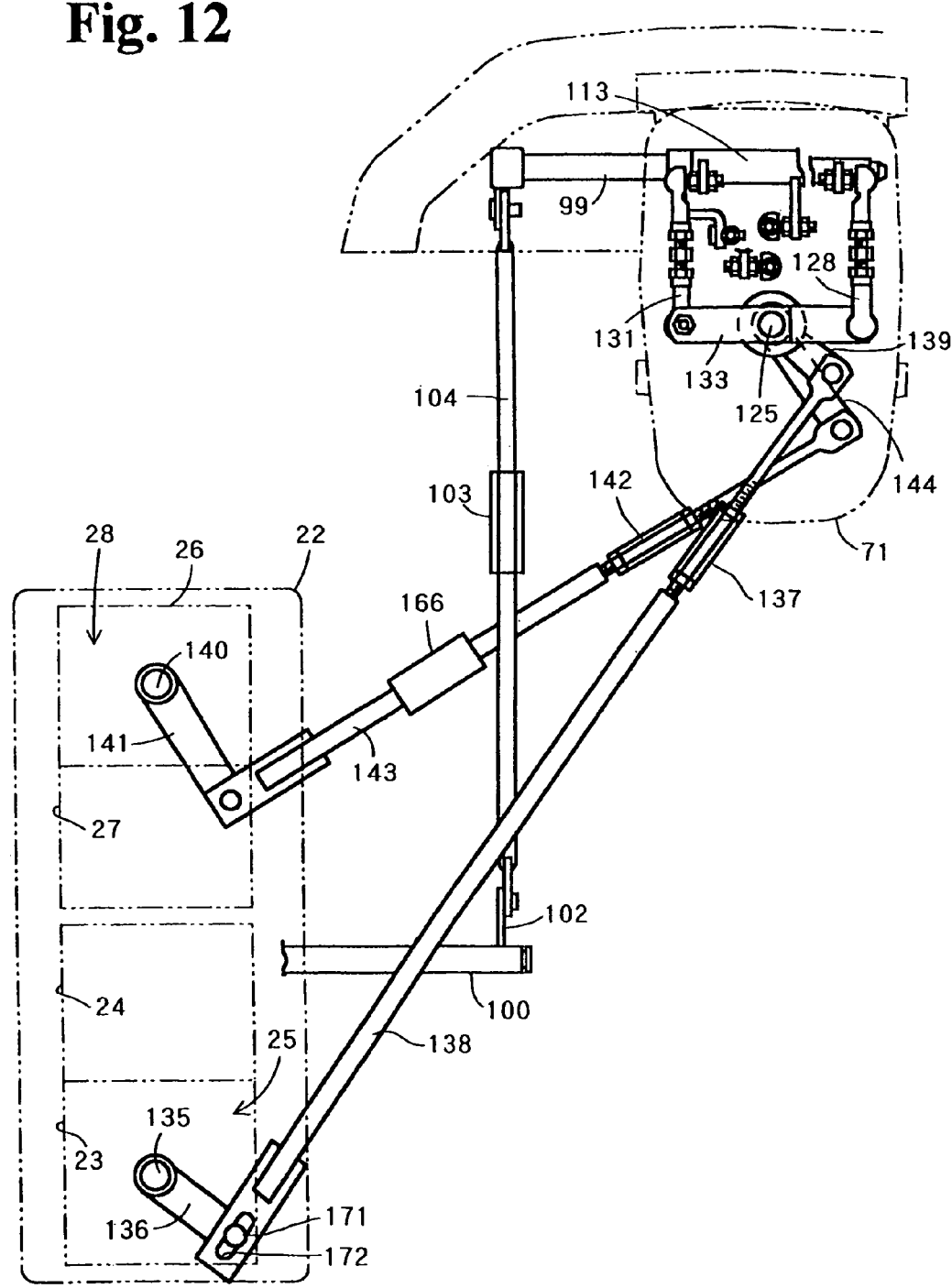
FIG. 12 is a plan view of the system shown in FIG. 4.
Figure 13:
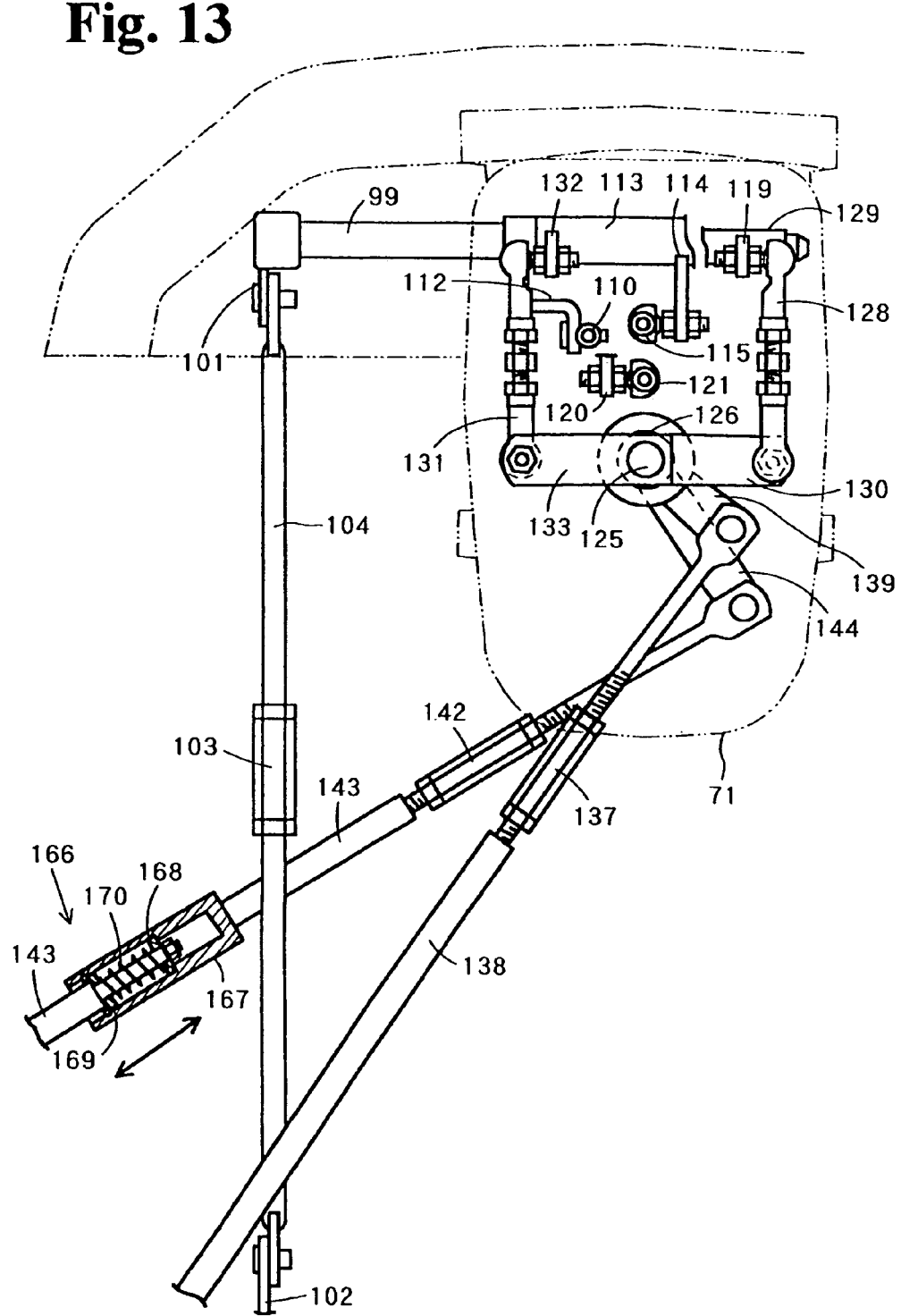
FIG. 13 is an enlarged plan view of a part of the system.

As shown in FIGS. 12 and 13, a retractibly extensible damper 166 is fixed on the steering rod 143 at its middle portion. A casing 167, that is attached to an end of aligned halves of this rod 143 have, is a constituent of the damper 166 accommodating a coiled spring. The damper 166 further comprises spring seats 168 and 169 that are formed integral with an end of the other end of the other half of the rod 143. The coiled spring 170 surrounding the other half's end is compressed between those seats 168 and 169. The steering wheel 19 will tend to apply to the steering rod 143 either a pushing force or a pulling force, beyond a certain limit. This limit corresponds to a steered angle of 116 (hundred and sixteen) degrees (that is equal to 85% of the maximum angle) of the steering wheel, where the steering control arm 141 will exert a maximum output. If the wheel 19 is rotated to exceed this limit, then the spring 170 will cause the rod 143 either to extend or to shrink. Therefore, it is possible to further rotate the steering wheel from 116 to 135 (hundred and thirty-five) degrees, with the second oil-hydraulic pump 26 being kept at its highest output level.

Figure 19:
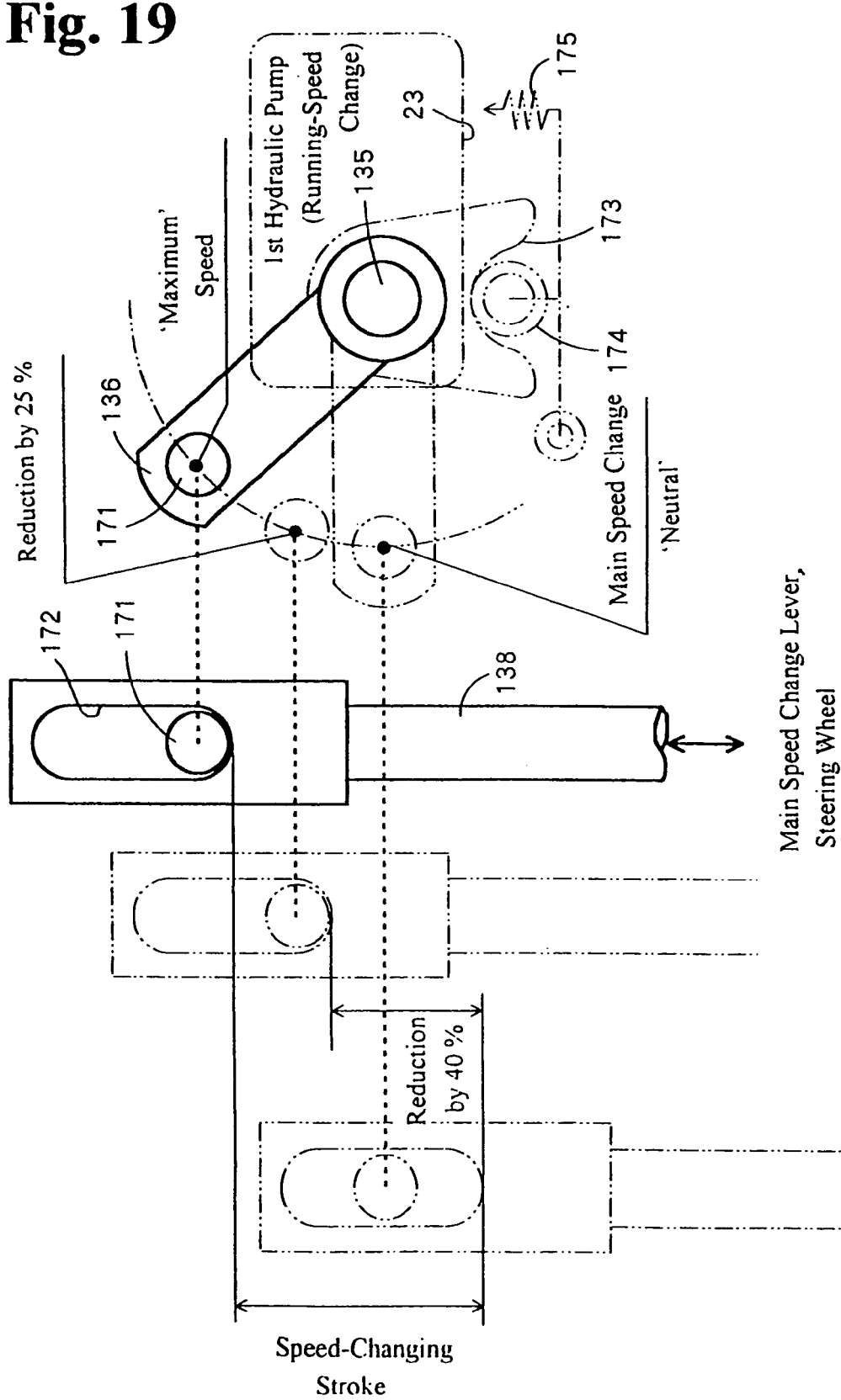
FIG. 19 is a scheme of operation of a speed change apparatus.
Figure 20:
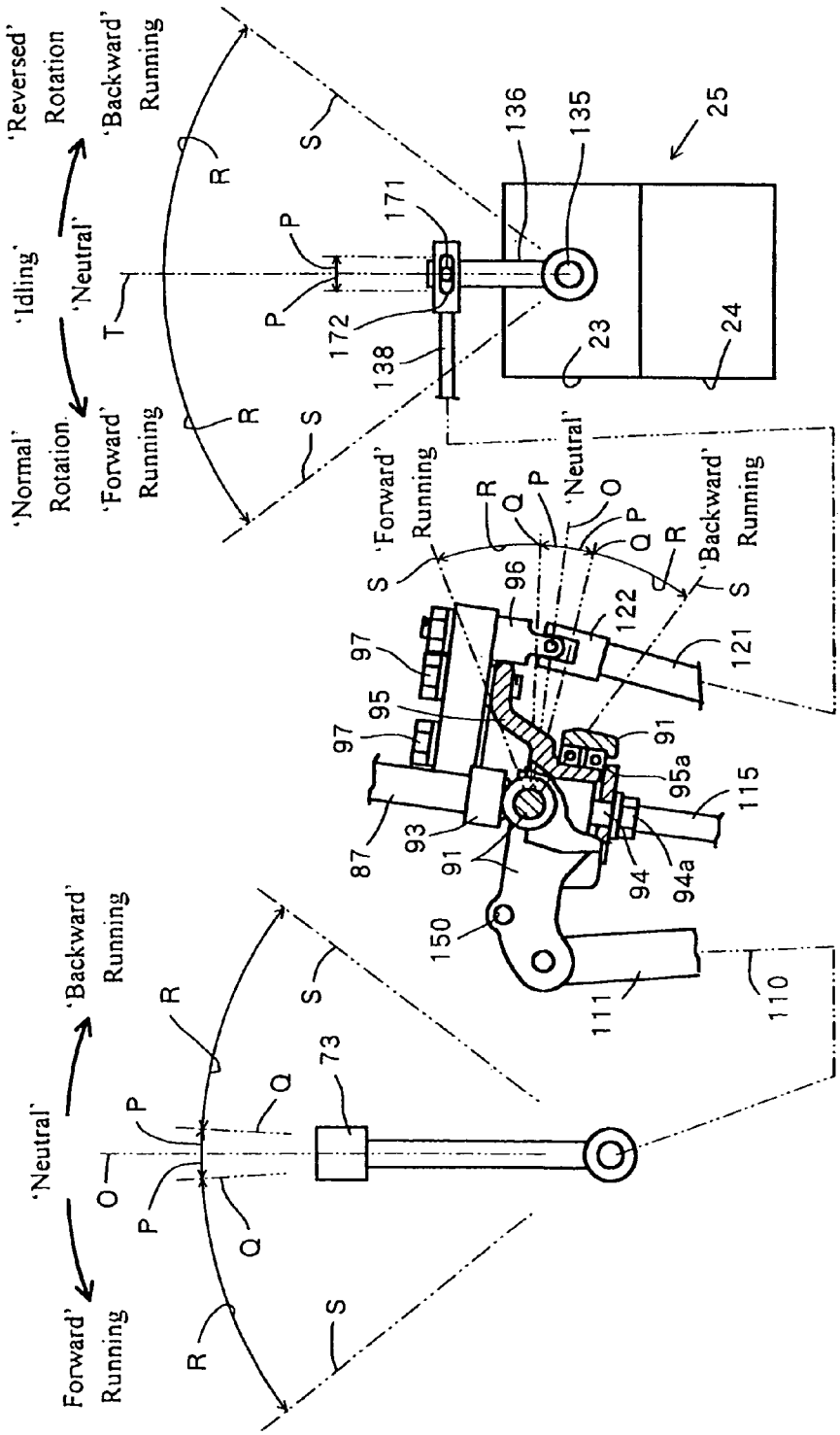
FIG. 20 also is a scheme of a main speed changer.

As shown in FIGS. 12, 19 and 20, a pin 171 is fixed on the speed change control arm 136. An elongated or elliptic hole 172 formed in the speed change rod 138 receives the pin 171 to be slidable therein, thereby operatively connecting the arm 136 to the rod 138. A detent cam 173 fixed on the control arm 136 is in alignment therewith, and a spring 175 urges a detent roller 174 into engagement with this cam. The detent roller 174 cooperates with the detent cam 173 to cause the speed change control arm 136 to automatically return to neutral position. There may be an occasion that this speed change arm 136 remains at its neutral position to keep idle the first oil-hydraulic motor 24, with the main change speed lever 73 being at neutral position to hold the pin 171 at a middle region of the elongated hole 172. In this occasion, substantially the same stroking distance will be provided for the pin 171 whether the speed change rod 138 is pulled or pushed causing the vehicle to run forwards or backwards. Thus, forward and backward motions of the control arm 136 will generally be symmetrical with each other.

As illustrated in FIG. 20, the main speed change lever 73 at its neutral position 'O' may be operated to either side. Consequently, this lever 73 will thus pass through either insensitive zone 'Q', before reaching either change speed initiation point 'P'. The speed change rod 138 thus pushed or pulled will bring the pin 171 into contact with either end of the elongated hole 172, and the speed change lever 73 starts to actuate the speed control arm 136. This lever 73 may further be operated through its acceleration/deceleration zone 'R', until stopped at any point behind a maximum output limit 'S'. Accordingly, the speed control arm 136 will leave its neutral position 'T' and then move a distance through its acceleration/de-celeration zone 'R', in proportion to displacement of the lever 73, but behind its maximum output limit 'S'. The first hydraulic motor 24 in the speed change apparatus 25 will thus output its power at a speed that has been selected in such a step-less manner, so that both the crawlers 2 are driven at the same speed and in the same direction, either forward or backward.

Figure 21:
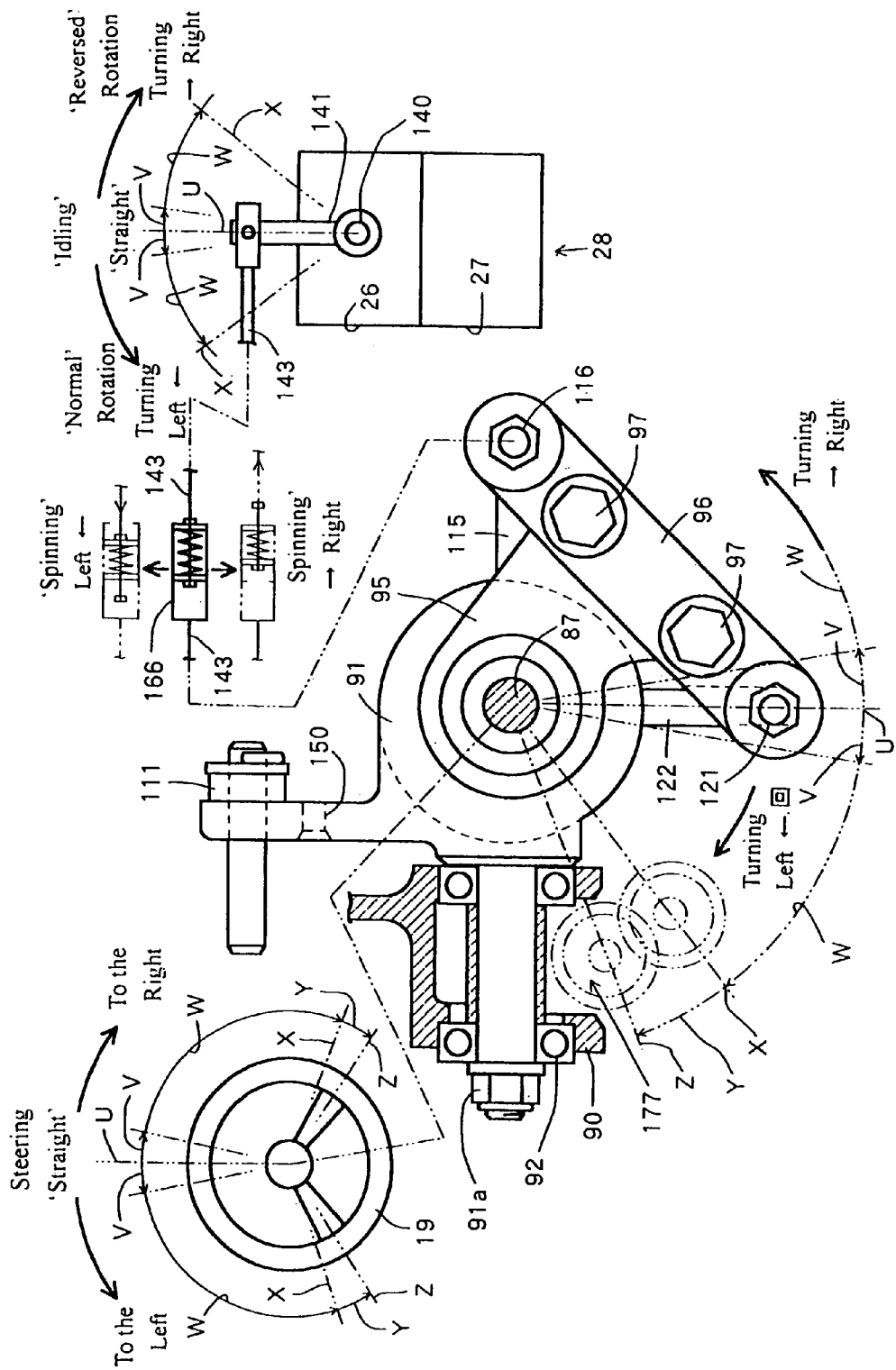
FIG. 21 is a scheme of operation of a steering apparatus.
Figure 22:
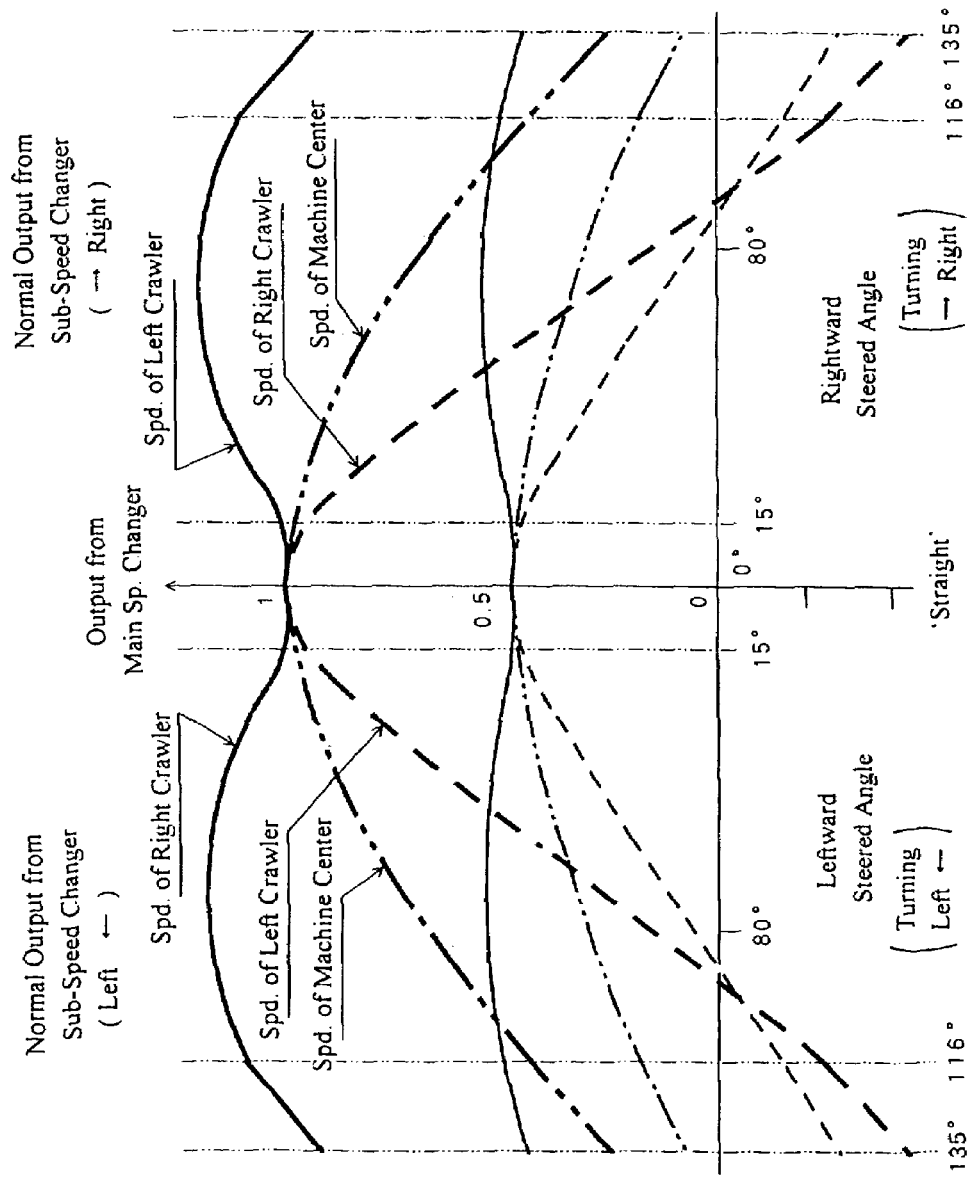
FIG. 22 is a diagram of relationship between the main speed changer and a steering wheel.

As seen in FIGS. 14, 21 and 22, a recess 177 is defined in and by a cutout 176 the bearing member 90. This recess will receive the joint member 122 and the speed change link 121 when the steering wheel 19 is steered to the left up to the maximum angle (135 degrees). As compared with an imaginary case wherein the joint member 122 directly contacts the bearing member 90, maximum deceleration degree is increased herein to follow a larger steered range of the wheel 19. Two constant speed zones 'V' are provided each beside a neutral position 'U' of the steering wheel 19 commanding the vehicle to advance along a straight path. With the said wheel being operated within a range of up to 15 degrees on either side, the running path can be adjusted without altering velocity of vehicle's center. The wheel 19 may further be operated through a turning zone 'W' but up to a maximum output position 'X' for the steering apparatus 28, this position corresponding to rotation of said wheel by 116 degrees. The steering control arm 141 will thus be shifted an angle in proportion to the swiveled angle of the steering wheel 19, but also up to the maximum output position 'X'. Accordingly, the second hydraulic motor 27 in the steering apparatus 28 changes its output in a step-less manner, gradually changing difference in speed between the right and left crawlers 2. Simultaneously with this process, the speed change rod 138 and the speed control arm 136 will be caused to move in a reversed direction towards their neutral position also in proportion to the swiveled angle of the steering wheel 19, thereby gradually lowering the absolute velocities of the crawlers 2. In short, a greater angle of the steering wheel 19 will bring about a smaller turning radius and a lower overall speed of the vehicle turning either to the right or to the left. If however the steering wheel 19 is operated beyond 116 degrees but short of a maximum steer limit 'Z' so as to enter a spinning turn zone 'Y', the damper 166 will extend or shrink to change effective length of the adjustable rod 143. At this stage, the steering control arm 141 is kept at the maximum output position 'X', with both the speed change rod 138 and control arm 136 being further shifted to their neutral position to effect a spinning turn about the vehicle center intermediate the right and left crawlers 2.

As shown in FIGS. 19 to 21, the speed change rod 138 is connected to the speed control arm 136 in the elongated hole 172, to give the main speed change lever 73 an increased apparent stroke 'L' larger than an actually-needed stroke. The bearing member 90 has the recess 177 facing the joint member 122 and the latter moving to the left will fit in the recess, so that a maximum speed reduction ratio of 25% is attained at maximum output position of the speed change lever 73, corresponding to maximum operated angle (135 degrees) of the steering wheel 19. If the vehicle is lacking in such a feature, its minimum speed would merely be 40% due to the speed change mechanism 124 discussed above. However in this invention having that feature, said ratio will further be lowered to 25% so as to much more reduce the vehicle speed, enabling it to make a spinning turn. Thus, it can spin its body at any bare end area in a farm, changing its position by 180 (hundred and eighty) degrees to transfer to the next row of un-reaped crops. As will be seen in FIG. 22, at the maximum output position of the main speed change lever 73 and at the operated angle of 116 degrees of the steering wheel 19, the damper 166 will start to function. As a result, speed reduction will be maintained generally at the same ratio for both the right and left crawlers 2 within a range of 116 to 135 degrees of the wheel 19. This means that a maximum difference will be reached between the crawlers 2 at the operated angle of 116 degrees of the steering wheel, and continue until the maximum angle 135 degrees so that the overall running speed is reduced in proportion to the operated angle of wheel 19.

The speed control arm 136 is displaced herein a more increased distance to lower vehicle speed as the steering wheel 19 is operated, to an extent that the vehicle can now surely spin at the bare end area in farm. The pin 171 connects the speed change rod 138 to the speed control arm 136, within the elongated hole 172. Size or dimension of those hole 172 and pin 171 may be designed to easily select an operable extent of the rod 138 or a reduction ratio given by the arm 136. Thus, output characteristic of the speed change and steering apparatuses 25 and 25 as well as speed reduction behavior of the steering wheel 19 can readily be taken into account when a simpler structure for mounting the speed change rod 138 is wanted. Such a simpler structure of this rod will improve assembling works and maneuverability thereof and to lower manufacture cost.

The main speed change lever 73 operated in the insensible zone 'P' will cause the input members 95 and 96 to leave their neutral position 'P' and to swivel around the input shaft 91 and onto the speed change initiation position 'Q'. The steering wheel 19 operated in the constant speed zone 'V' beside its neutral position for straight running will increase ratio of motion of the steering control arm 141 to an operated angle of the steering wheel 19. With the speed change lever 73 being subsequently shifted into the acceleration/deceleration zone 'R' to cause the vehicle to run gently, the steering wheel 19 operated in the constant speed zone 'V' will further increase the motion of the steering control arm 141. As a result, a ratio of change in rotational speed of the second hydraulic pump 26 in the steering apparatus 28 will be increased to the operated angle of the steering wheel 19. A time for turning the vehicle will thus be shortened while the second pump 26 is giving a moderately gentle output, so that the second hydraulic motor 27 also operating at a gentle level of output will inhibit the vehicle from turning. In other words, the steering wheel 19 can cause the vehicle to turn only when the output from the second pump 26 is raised above a certain level, insofar as the main speed change lever 73 is at its gentle speed position. It will be apparent that this speed change lever 73 may be operated in such a manner that it starts to effectively change the vehicle speed only after the steering wheel 19 has become able to control the steering apparatus 28 to exert a vehicle-turning power above a certain level. This feature will compensate the relatively weak turning power of the apparatus 28 in the vehicle then gently running, and reduce manufacture cost of said apparatus and relevant parts, improving steerability of the crawlers 2. In more detail, the speed change lever 73 will rotate at first the steering and speed change input members 95 and 96 over a certain angle, so that these members thus operatively connected to the speed change apparatus 25 will actuate it. After these members 95 and 96 are caused then also to take their steering position, the change speed apparatus 25 will effectively act to drive the crawlers 2. Even when the vehicle is running slowly with a lower level output from said apparatus 25, the steering wheel 19 can be operated to intensively control the steering apparatus 28 to ensure a sufficient turning power for such a slowly running vehicle.

With the main speed change lever 73 standing at its neutral position, the steering wheel 19 may be operated in a forward (or reversed) direction. The input members 95 and 96 will thus move together with the links 115 and 121 about the axis of steering input shaft 87 and on and along a conical locus. In this state, all of the output members 114 and 120 and the output shafts 113 and 119 remain still. However, the speed change lever 73 can be tilted forwards (or backwards) to cause a forward advance (or rearward advance) to the vehicle. Consequently, those input members 95 and 96 will tilt forwards (or backwards) about the axis of speed change input shaft 91, so that the steering joint member 116 remains still at the given position, while raising (or lowering) the change speed joint member 122. The speed change output member 120 will thus rock upwards (or downwards) to rotate the output shafts 119 in a forward (or reversed) direction. The first hydraulic pump 23 in the speed change apparatus 23 will in this way have its inclined rotary plate changed in angle to operate the first hydraulic motor 24 in a forward (or reversed) direction. Its output shaft 31 thus revolving in a forward (or reversed) direction drives the crawlers forwards (or backwards). In such an operation, rotational speed of the output shaft 31 increases or decreases in proportion to the angle to which the lever 73 is tilted, thereby steplessly changing the forward (or rearward) speed of the crawlers 2.

In another condition that the speed change lever 73 is tilted forwards (or backwards) to cause a forward advance (or rearward advance) to the vehicle, the steering wheel 19 may be operated to swivel to the left (or to the right). Consequently, the steering input member 95 will tilt forwards (or backwards) about the axis of steering input shaft 87, so that the steering joint member 116 is lowered (or raised) to rock the steering output member 114 upwards (or downwards). This member 114 will thus rotate the steering output shaft 113 in a forward (or reversed) direction, whereby the second hydraulic pump 26 in the steering apparatus 28 has its inclined rotary plate changed in angle to operate the second hydraulic motor 27 in a forward (or reversed) direction. Its output shaft 68 thus revolving in a forward (or reversed) direction decelerates (or accelerates) the crawlers 2, simultaneously accelerating (or decelerating) the right-side crawler 2 so as to turn the vehicle to adjust its running path to the left (or to the right). With the steering wheel 19 swiveling to the left (or to the right) to adjust the running path, the speed change input member 96 tilts forwards (or backwards) away from the axis of change speed input shaft 91 and simultaneously rotates around the axis of steering input shaft 87 in a forward (or reversed) direction. As a result, the change speed joint member 122 is lowered (or raised) to rock the output member 120 upwards (or downwards) to rotate the change speed output shaft 119 in a forward (or reversed) direction. This means that the speed change apparatus 25 is forced towards its neutral position so as to speed down the output shaft 31 to decelerate the vehicle.

The swiveling of the steering wheel 19 during advance of the vehicle will give rise to change in its turning radius (i.e., angle) and also in its running speed, both in a proportional manner. In detail, the larger angle by which the steering wheel 19 is rotated, the greater difference will be produced in speed between the crawlers 2 and the smaller radius turn the vehicle will make, while being further decelerated. On the other hand, the universal joint-shaped member 116 in the steering system will operate in one or the other of opposite directions, depending upon whether the vehicle moves forwards or backwards, thus depending upon whether the steering wheel be turned to the right or to the left. This means that the vehicle turns in the same direction as the wheel rotates, whether it is running forwards or backwards. Thanks to this feature, a round steering wheel 19 that may be mounted on a tractor, a rice-planting machine or the like will give a driver an operation feeling similar to that which he or she may experience when driving any four-wheel automobiles.

FIG. 22 illustrates a relationship between the operated angle of the steering wheel 19 and the speeds of the right and left crawlers 2. As seen in this figure, difference in speed between the crawlers will become greater as the wheel 19 is operated more and more. An average speed of those crawlers 2, that is the speed at which the center of the vehicle advances, may further be reduced in response to changeover of the subsidiary speed change lever 74 (between the higher, middle and lower ranges of speeds). There may be an exemplary case of adjusting the reaping path by rotating the wheel 19 about 15 (fifteen) degrees or less to the left (or to the right) away from its neutral position. In this case, the joint member 122 in the speed change system will be shifted substantially in a tangential direction following the rotation of input member 95. The speed change output member 120 is not displaced noticeably from its straight running position. However, the second pump 26 in the steering apparatus 28 is operated to actuate the second motor 27 in a forward (or reversed) direction in order that the vehicle turns to the left (or to the right) so as to follow a curved row of un-reaped crops. In such an event, an extent to which one crawler advancing on an inner course with respect to locus of the vehicle is decelerated will be equal to that to which the other crawler advancing on an outer course is accelerated. Thus, the center of the vehicle will move at almost the same speed as it travels on a straight path. There may be another occasion that the steering wheel 19 is operated more than 15 (fifteen) degrees. On this occasion, the rotating input member 95 will pull or push the change speed link 121 to decelerate the output member 120, regardless of the direction in which the vehicle is turning either to the right or to the left. Consequently, the first hydraulic pump 23 and motor 24 will reduce their output to drive both the crawlers 2 in the same direction, causing the vehicle to make a 'braked turn' to the left (or to the right) due to differential speed between the crawlers. Such a motion of the vehicle may be useful when returning it to the present row of un-reaped crops, if it has deviated therefrom, or when transferring it to the next row. If the steering wheel 19 is rotated about 116 (hundred and sixteen) degrees or more, then the damper 166 will come into effect such that the maximum steering force continues to be output. Until the steering wheel is operated to the maximum angle 135 (hundred and thirty-five) degrees, the speed of the vehicle center will decrease more to become about one fourth of that for straight running. In this state, the inner crawler 2 with respect to the turning radius is caused to rotate in a reversed direction, thus forcing the vehicle to turn about its center located intermediately between its crawlers. This motion is called 'spinning turn' herein. The vehicle's turning of 180 (hundred and eighty) degrees will be accompanied by a transverse displacement thereof by a distance corresponding to transverse width of its crawlers. It will now be apparent that the steering wheel 19 is operable between the range of steered angles from 0 to 135 degrees, wherein operation of the wheel up to 15 degrees offset from neutral position allows the vehicle straightly running at its normal speed to be shifted sideways to advance exactly along the subject crops row in issue. As discussed above, if the wheel 19 is operated an angle from 116 to 135 degrees, then the 'spinning turn' will be made with the maximum output from the steering apparatus 28 but at an automatically reduced speed that is one fourth (i.e., 25%) of the normal speed, so as to enable the vehicle to transfer to the next course on the bare end area in any farm.

The subsidiary speed changer may be set at 'standard' speed (1.5 m/sec), and at this speed the steering wheel may occasionally be revolved 90 (ninety) degrees. On such an occasion, only the turning speed (that is velocity of the vehicle center) will be changed, with turning radius remaining unchanged. This applies to any exemplary cases wherein the main speed change lever 68 is operated to provide the highest velocity, two thirds thereof or one third thereof. Further, within a range which the elongated holes 149 in engagement with the linkage bolts 97 provides, the first hydraulic pump 23 and motor 24 will continue to drive the vehicle to run straightly. Therefore, the vehicle is protected from any inadvertent and irregular change in speed while it is steered to follow any row of crops or any ridge in a farm. The vehicle can now adjust its running path, without affecting the generally constant speed of the vehicle being steered, but giving a driver a normal driving feeling in harmony with its natural motion. The subsidiary speed change lever 74 causes a shift between target speeds for the main speed change lever 73. Thus, the subsidiary lever 74 may be operated to take its position presetting lower, normal or higher speeds for the vehicle in order to vary its turning radius from minimum to maximum. By virtue of this feature, it is easy to predetermine the reduction ratio of the first hydraulic pump 23 to its motor 24 and that of the second pump 26 to its motor 27. A sufficient traction power is also ensured for smaller radius turning motions such as the 'spinning turn'. In detail, at any position of the subsidiary speed changer, the main speed change lever 73 can be operated to change actual speed of the vehicle making a turning motion of the same radius.

Figure 11:
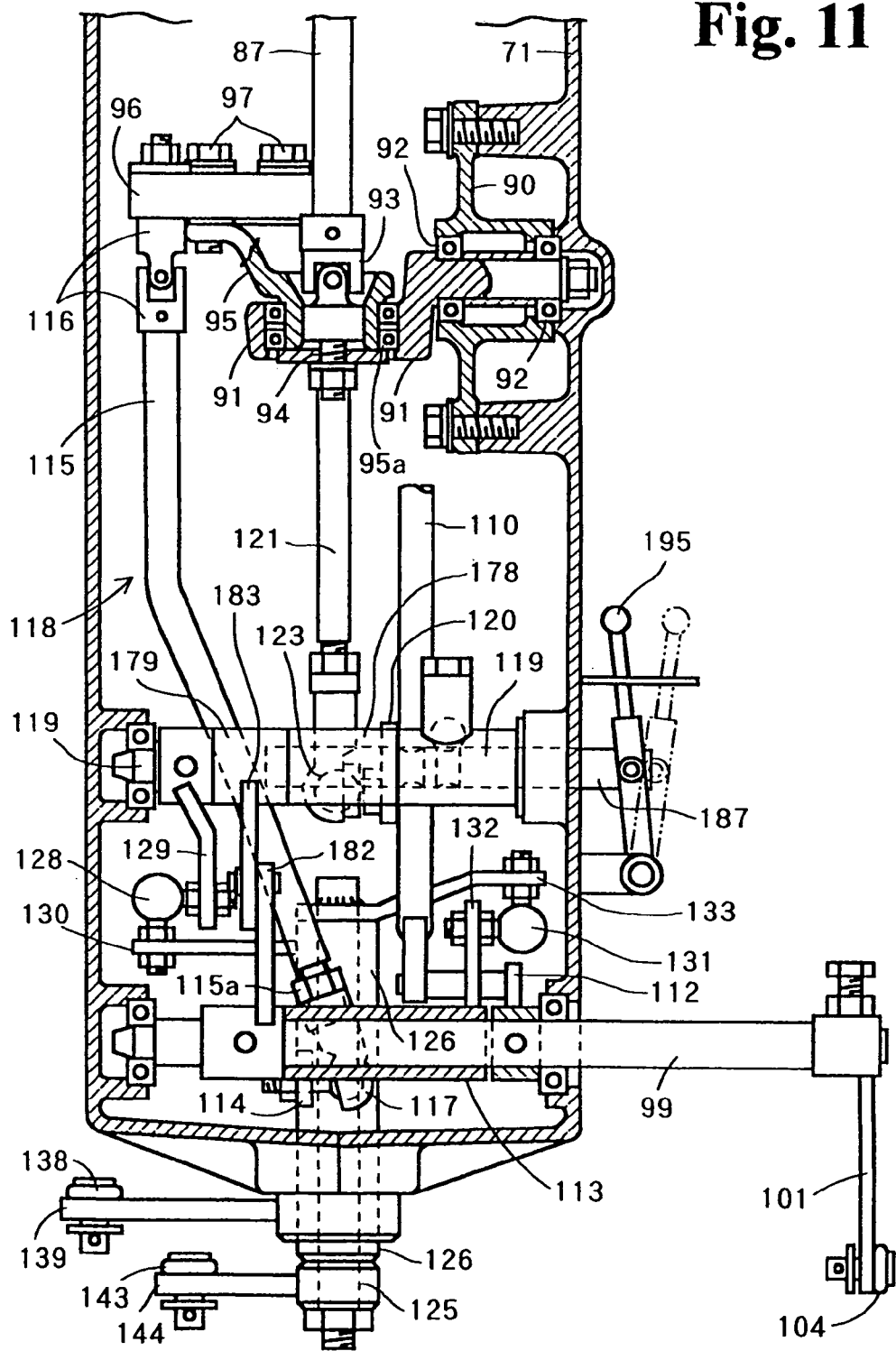
FIG. 11 is an enlarged front elevation of a lower part of the column.
Figure 23:
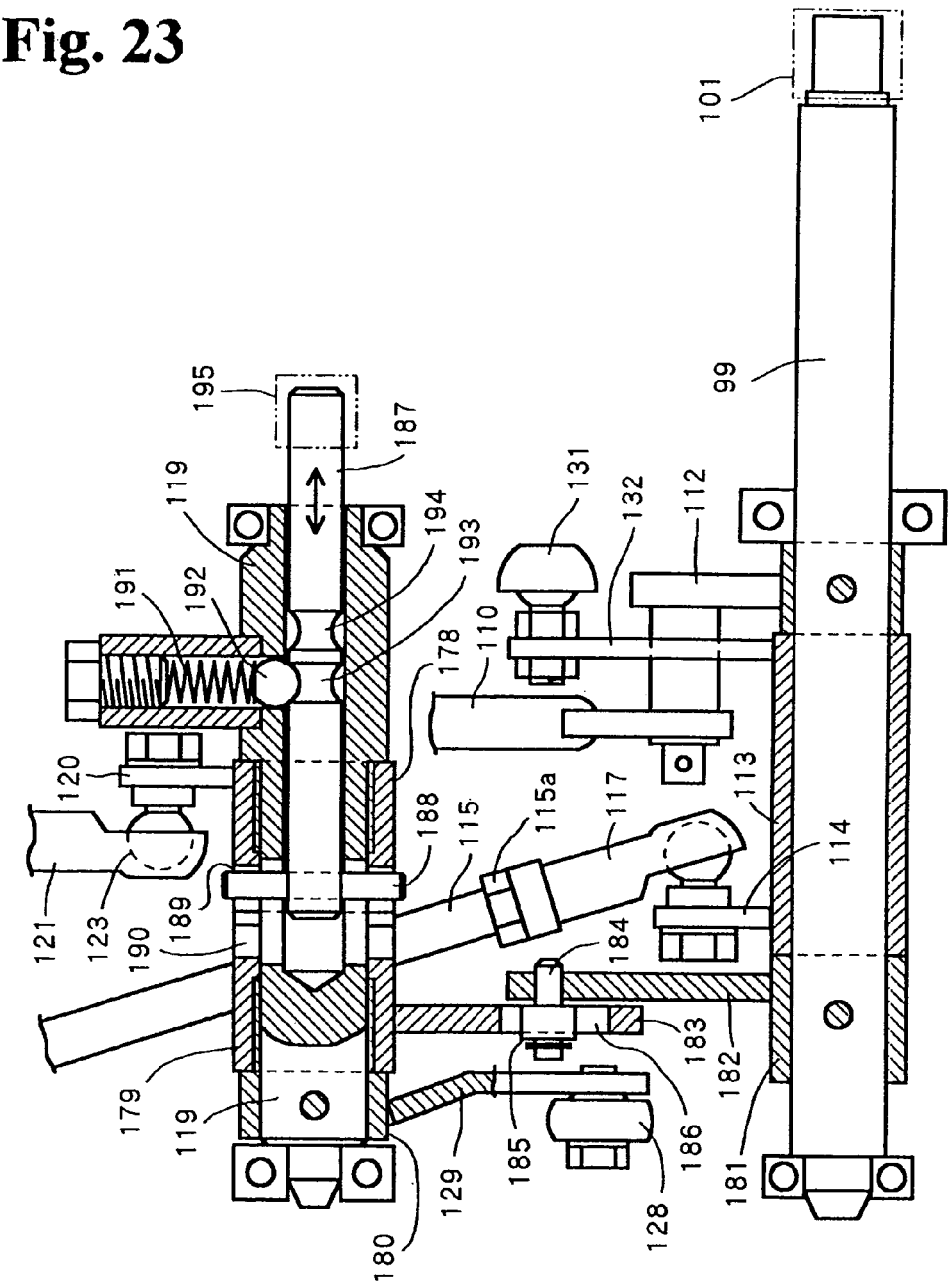
FIG. 23 is a front elevation of a switching-over mechanism for alteration of output level in response to speed change.
Figure 24:
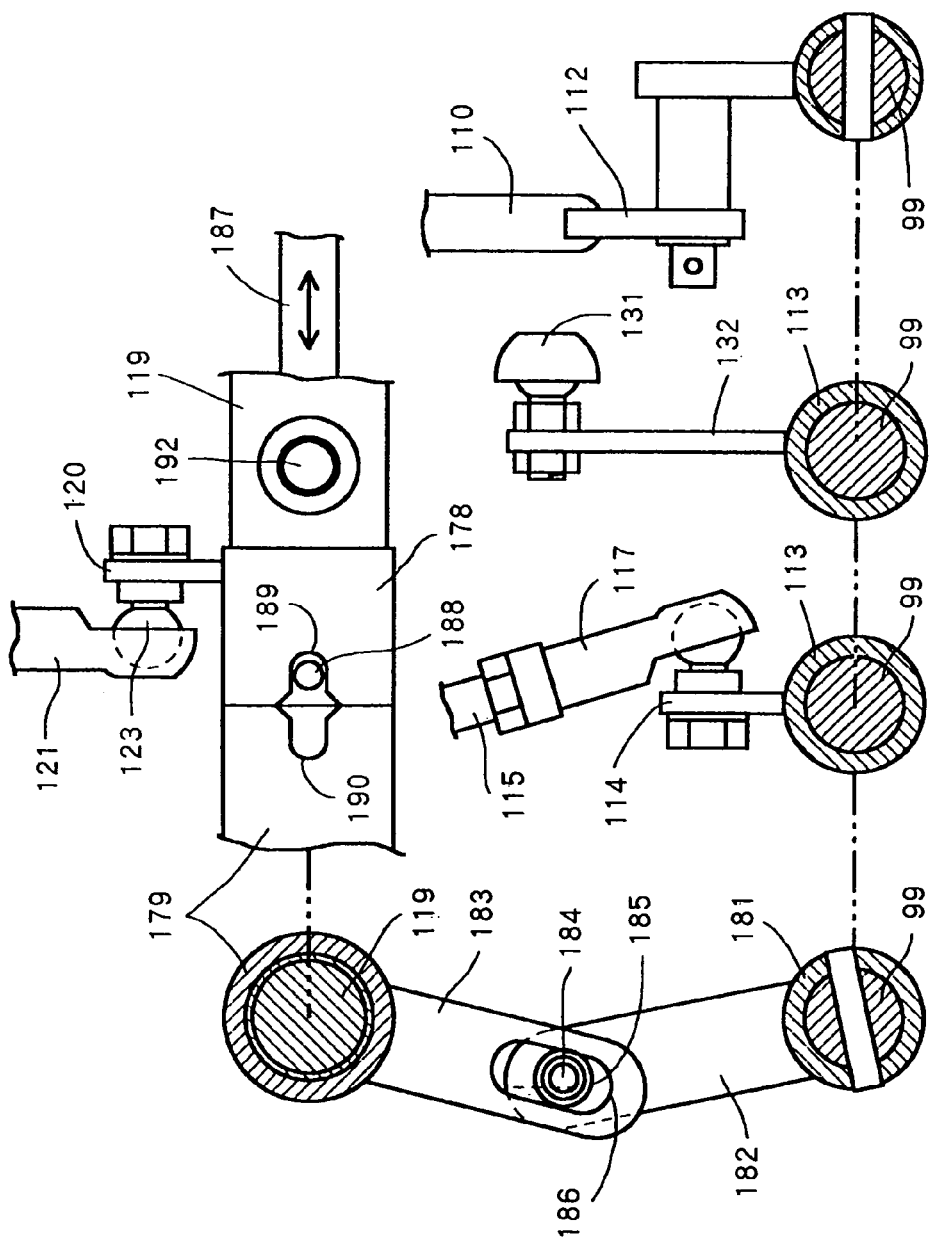
FIG. 24 is a fragmentary scheme of the switching-over mechanism.

As shown or seen in FIGS. 11, 23 and 24, the change speed output shaft 119 rotatably carries thereon the cylindrical interconnect output shafts 178 and 179, the former 178 being for a reducing connection and the latter 179 being for a direct connection. The speed change output member 120 is fixed on the reducing interconnect shaft 178. Further, the speed change link 129 is fixed on the change speed output shaft 119 by means of a boss 180. Another boss 181 serves to fix a direct input link 182 on the main speed shaft 99. A direct output link 183 is fixed on the direct interconnect shaft 179. A roller 185 rotatably mounted on a short shaft 184 of the direct input link 182 does slidably fits in an elongated hole 186 that is formed in the output link 183. These links 182 and 183 cooperate with each other to operatively connect the direct interconnect shaft 179 to the main speed shaft 99, so that these shafts 99 and 179 rotate in unison.

The change speed output shaft 119 has a bore in which a clutch shaft 187 slides fore and aft. A clutch pin 188 fixed on an inner end of the clutch shaft 187 is engageable with the output shaft 119. Notches 189 and 190 engaging with and disengaging from the clutch pin 188 are formed in the interconnect output shafts 178 and 179, respectively. By shifting the clutch shaft 187 inwards or outwards, the clutch pin 188 will selectively engage with one of the notches 189 or with the other 190. Either the reducing interconnect shaft 178 or the direct interconnect shaft 179 is brought into a selective connection with the change speed output shaft 119. A positioning ball 192 is always urged by a spring 191 towards the clutch shaft 178, which has positioning grooves 193 and 194 brought into a selective engagement with the ball 192. Thus, if one of the grooves 193 fits on this ball 192, then the clutch pin 188 will be in engagement with one of the notches 189. If contrarily the other grooves 194 fits on this ball 192, then the clutch pin 188 will be in engagement with the other notches 190. On the other hand, a feeling lever 195 is disposed outside the steering column 71 so as to be maneuvered by a driver whose feet are on the operator step 134. This lever 195 is connected to the clutch shaft 187 to be operated thereby for changeover between its positions. This feature enables that either the speed change output member 120 or the output link 183 does input power to the change speed link 129. An acceleration/deceleration commanding power either from the steering wheel 19 or from the main speed change lever 73 will be input to speed change apparatus 25 to be controlled, wherein the operated degree of said wheel 19 proportionally decelerates the vehicle.

Now, it will be apparent from the foregoing that the command input from the main speed change lever 73 is divided into two outputs by the main speed change shaft 99. One of such divided outputs is used as a deceleration command in proportion to the operated angle of the steering wheel 19. This output will be transmitted from the output member 120 to the speed change link 129, through the reducing output shaft 178 fitted on the speed change output shaft 119. The other divided output from the lever 73 will be transmitted from the output link 183 to the speed change link 129, through the direct output shaft 179 also fitted on the speed change output shaft 119. In this manner, either of those two outputs is selected on the speed change output shaft 119 in order to control the first hydraulic pump 23 in a desired mode. This feature will be preferred in any mobile agricultural machine whose right and left crawlers 2 receive traction power from speed change apparatus 25 controlled by main speed change lever 73, such that output therefrom is adjusted steplessly to alter velocity difference between the crawlers 2 by the steering wheel 19 controlling the steering apparatus 28. This is because the main speed change lever 73 is operatively connectable to the speed change apparatus 25 through reduction output shaft 178 functioning as a route for decelerating the vehicle proportionally to operated angle of the steering wheel 19, wherein said lever 73 is connectable also to said apparatus 25 through a third route, that is direct output shat 179. Alternative selection of either the former shaft 178 or the latter 179 will alter the vehicle's turning and/or running performance, enabling a choice between gentler turning and sharper turning, but without necessity of modifying the speed change apparatus 25 in any manner.

Also discussed above, the feeling selection lever 195 is provided to switch over the reducing connection output shaft 178 to the direct connection output shaft 179, or vice versa. This is for the purpose of selection between a reducing input and a speed changing input, to effect speed control using either one of the reducing and direct connection output shafts 178 and 179, enhancing steerability and improving maneuverability. Selection between the reducing input from the former output shaft 178 and the speed changing input from the latter 179 is conducted on a common shaft, controlling the speed change apparatus 25. Thanks to this feature, connection of both the change lever 73 and steering wheel 19 with the speed change apparatus 25 is simplified and compacted to render simpler the assembly and adjustment of relevant members.

Figure 25:
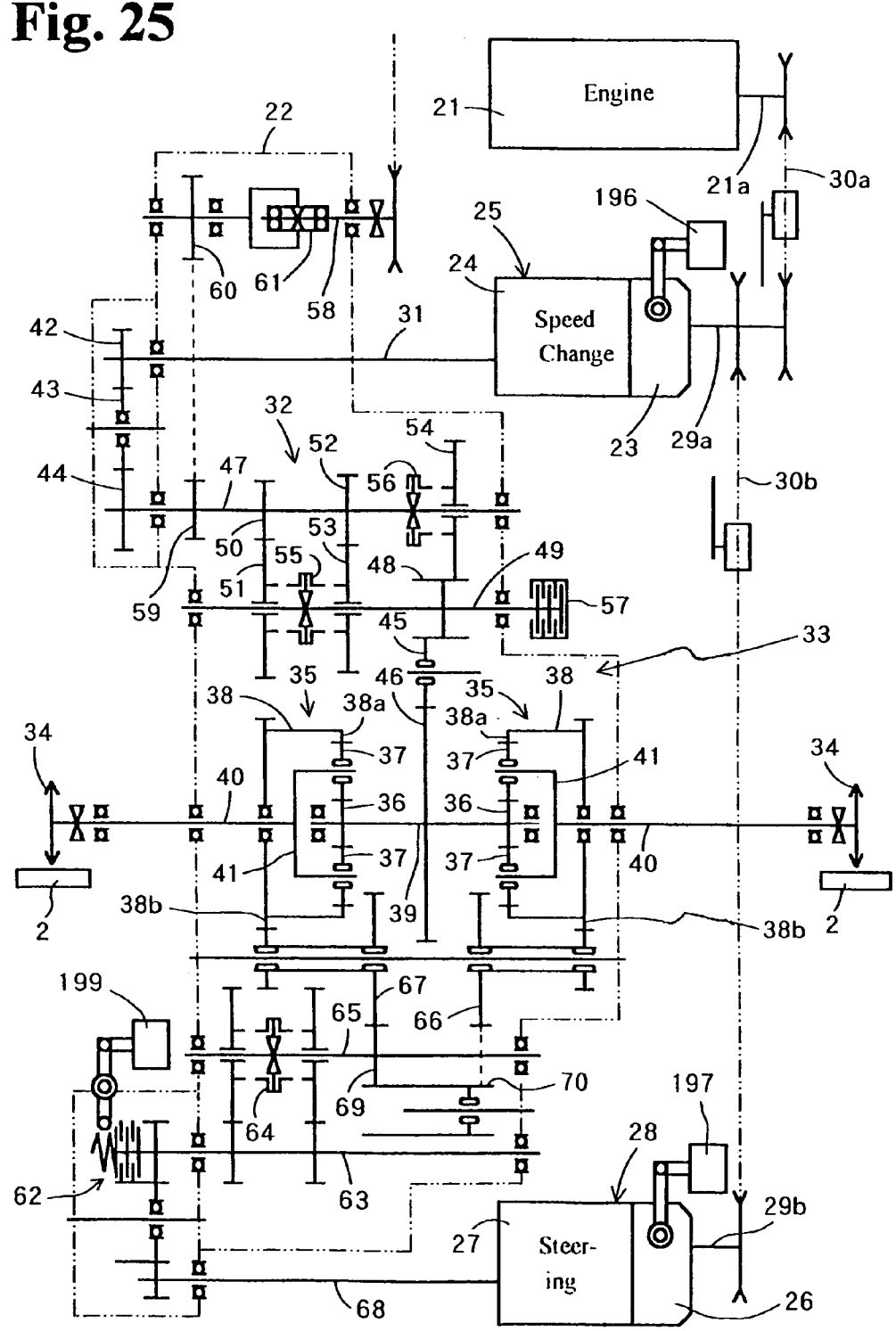
FIG. 25 is a scheme showing actuation of the speed change and steering mechanisms.
Figure 26:
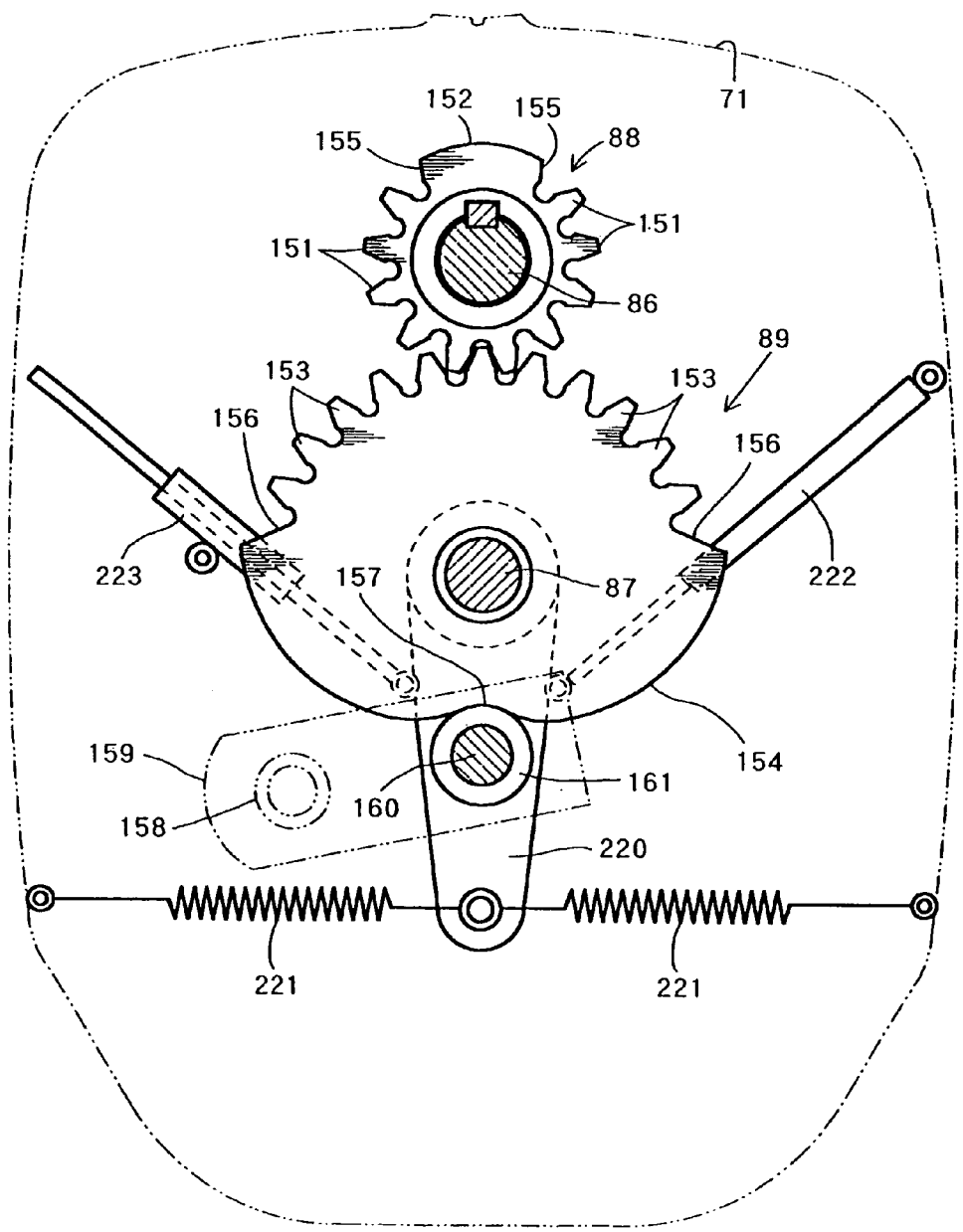
FIG. 26 is a plan view of parts relevant to the steering wheel.
Figure 27:
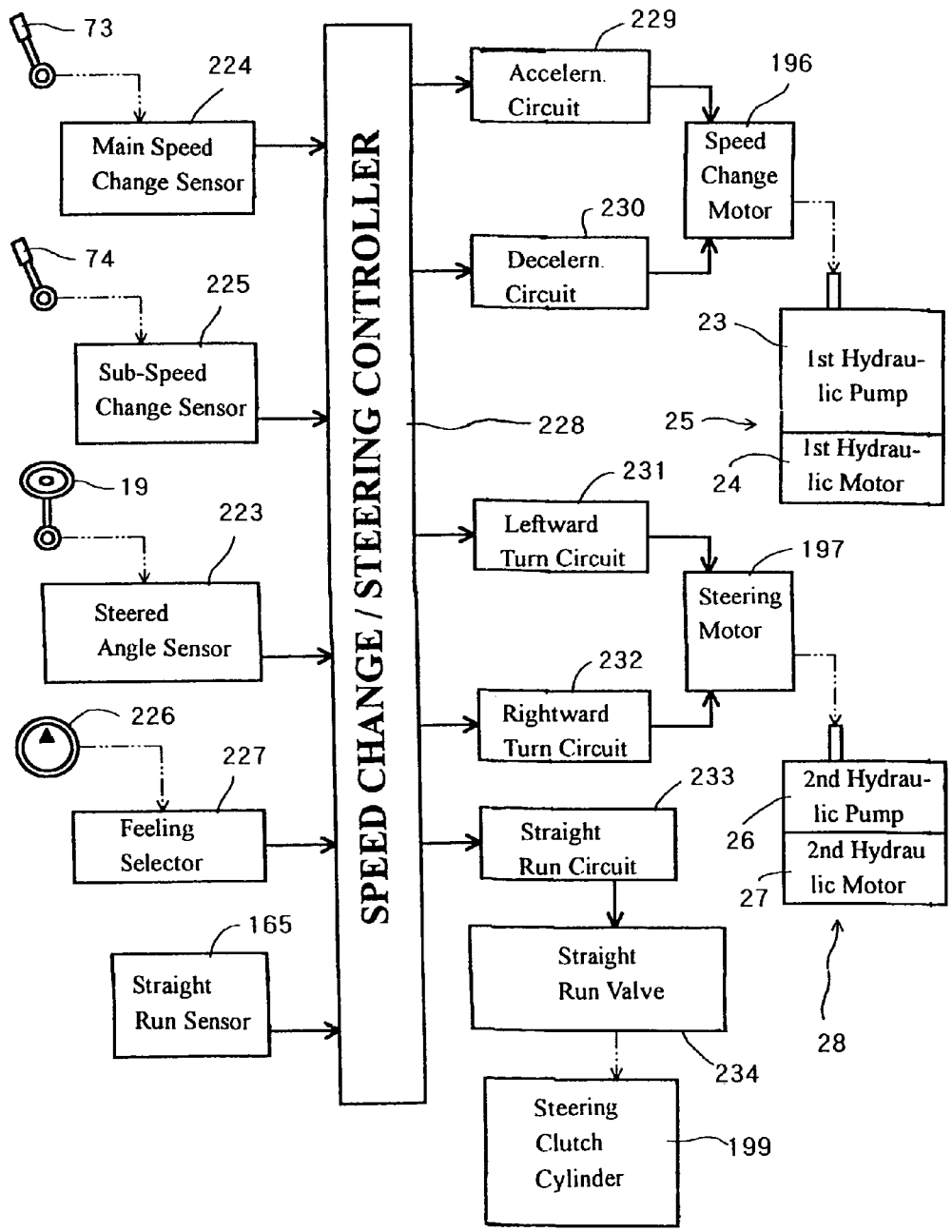
FIG. 27 shows a circuit for controlling the speed change and steering mechanisms.

As shown in FIGS. 25, 26 and 27, an electrical speed change motor 196 may be employed and actuated by manual operation of the main speed change lever 73. This motor 196 will function to change the angle of inclined rotary plate in first hydraulic pump 23, to thereby steplessly alter rotational speed of output shaft 31 of the first motor 24, in proportion to operated distance of said lever 73. That motor will also be actuated to switch over its direction of rotation between forward and reverse. An electrical steering motor 197 and a valve 198 for keeping straight running path of the vehicle may be employed together with a steering clutch cylinder 199. The steering motor 197 will be actuated by manual operation of the steering wheel 19, with the straight running valve 198 being actuated in response to neutralization of said wheel 19 and neutralization of the subsidiary change speed mechanism 32. The steering clutch cylinder 199 is operatively connected to the straight running valve 198. The latter electrical motor 197 will function to change the angle of inclined rotary plate in second hydraulic pump 26, to thereby steplessly alter rotational speed of its pump motor 27, in response to operated angle of steering wheel 19. That motor 197 will also be actuated to switch over angular direction of the second hydraulic motor 27, between forward and reverse, when causing the vehicle to the right or to the left to turn at the bare end area or adjust its running course. Accordingly, the steering wheel 19 will produce, corresponding to its operated angle, change in rotational speed of the steering motor 197. With the steering wheel 19 and subsidiary speed changer 32 being operated to take their neutral positions, the straight running valve 198 will automatically change its state so as to actuate the steering clutch cylinder 199. As a result, both the steering output clutch 62 and second hydraulic motor 27 will be turned off to cease the steering of vehicle.

A steering output arm 220 also possibly incorporated herein has its one end fixed on the steering input shaft 87. A pair of right and left coiled springs 221 to urge the steering wheel 19 towards its straight running position may be employed to be in an operative connection with the steering output arm 220. Resistant absorbers 222 cooperating with this arm will act against those springs 221 in order to retard rotational motion of the steering wheel 19. By virtue of these members, a driver who has operated the wheel 19 to the right or left does not have to manually restore its neutral position, because said members will automatically return it thereto. A steered-angle sensor 223 of the sliding potentiometer type may be applied to one of the output arms 220 so as to detect the operated angle of the steering wheel 19. A main speed-change sensor 224 also of the potentiometer type will detect the displaced position of the main speed change lever 73 in either direction, and the neutral position and changeover thereof between forward and backward running directions. A subsidiary speed-change sensor 225 will detect the displaced position of the subsidiary speed change lever 74 and its neutral position. A knob-shaped member 226 disposed on the top of steering column 71 is maneuverable with the driver's fingers. A turning-mode setting device 227 of the volume controller type is operable by the knob-shaped member 226 to change reduction ratio corresponding to the operated angle of steering wheel 19. The straight-advance detecting sensor 165 as well as the steered-angle sensor 223, main speed-change sensor 224, subsidiary speed-change sensor 225 and turning-mode setting device 227 are all electrically connected to a microcomputer, that constitutes a speed-change/steering controller 228.

Figure 28:
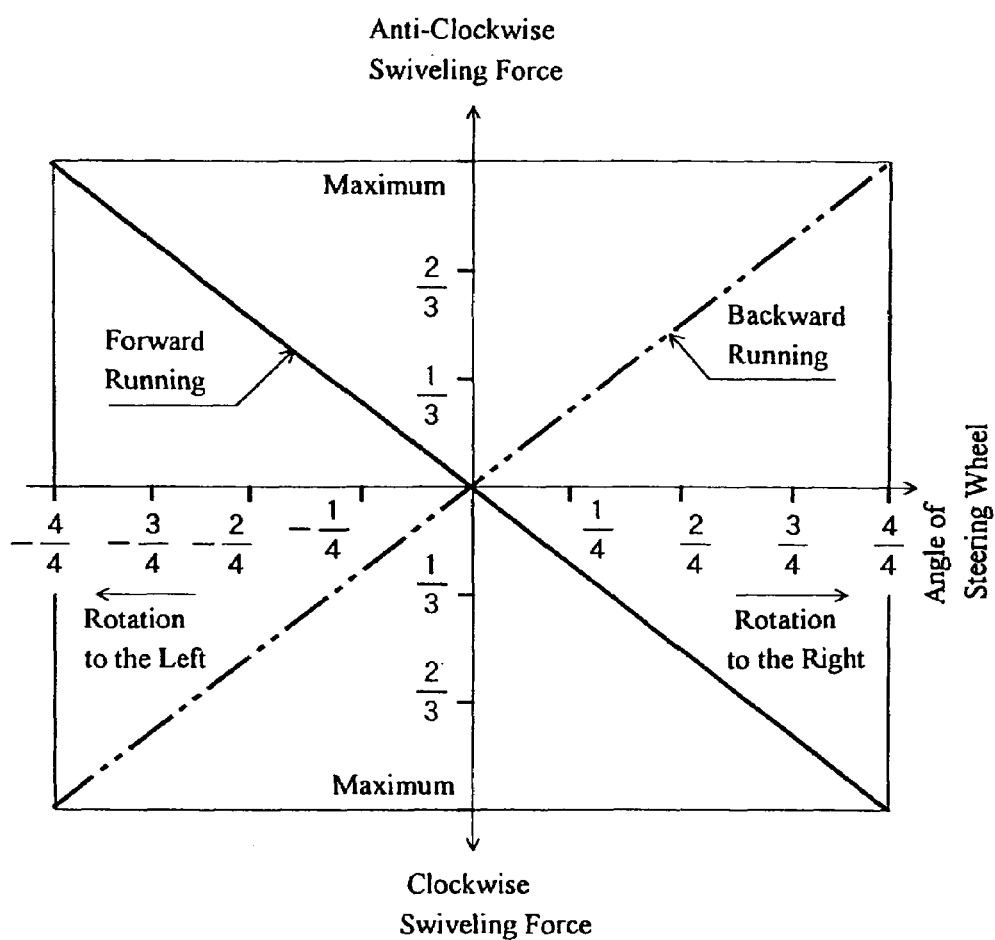
FIG. 28 is a diagram of relationship between the steering wheel and an output power for steering the vehicle.

The electrical speed change motor 196 will be actuated in a forward or reverse direction by an acceleration circuit 229 or deceleration circuit 230, respectively. These circuits 229 and 230 are connected to the controller 228 so that the motor 196 will alter the angle of slanted rotary plate in the first hydraulic pump 23 substantially in proportional to the operated angle of main speed change lever 73. The vehicle thus will run at a speed corresponding to the operated angle of the main speed change lever 73. Also connected to the controller 228 area left-turn circuit 231 and a right-turn circuit 232, which will energize the electrical steering motor 197 in a forward or reverse direction. The motor 197 will alter the angle of slanted rotary plate in the second hydraulic pump 26 substantially in proportional to the operated angle (to the left or to the right) of the steering wheel 19. As seen from the diagram of steering output given in FIG. 28, the vehicle will exert a clockwise-swiveling force by turning its steering wheel 19 to the right or to the left while it is advancing forwards or backwards, respectively. This motion will be reversed so that an anti-clockwise-swiveling force is obtained by turning the steering wheel 19 to the left or to the right while advancing forwards or backwards, respectively. Thus, the so-called 'reversed steering' is avoided herein which would otherwise inhibit the vehicle from being steered in the same manner as the ordinary four-wheel automobiles. Insofar as the main speed change lever 73 stands at its neutral position, the rotary plate in the second hydraulic pump 26 will remain non-inclined to interrupt output from the second motor 27. The vehicle whose change lever 73 is temporarily at such a neutral position can not turn itself in any way even if its steering wheel 19 would be operated in any direction. It will be apparent that the rotary plate in the second hydraulic pump 26 will increase its absolute angle of inclination as the operated angle of steering wheel 19 increases. However, the absolute angle varying in this manner is controlled herein to be proportional to the absolute angle to which the main speed change lever 73 will be operated from time to time. This feature enables the present vehicle to make the same steering motion as in the ordinary four-wheel automobiles, because the turning radius does not vary in response to any change in vehicle speed unless the steering wheel is operated further. A straight-run circuit 228 also is connected to the controller 228 so as to actuate a straight-run valve 234, which in turn will cause operation of the steering clutch cylinder 199. Thus, both the neutral position of the subsidiary speed changer and that of the steering wheel 19 are effective to automatically cease the steering output.

Figure 29:
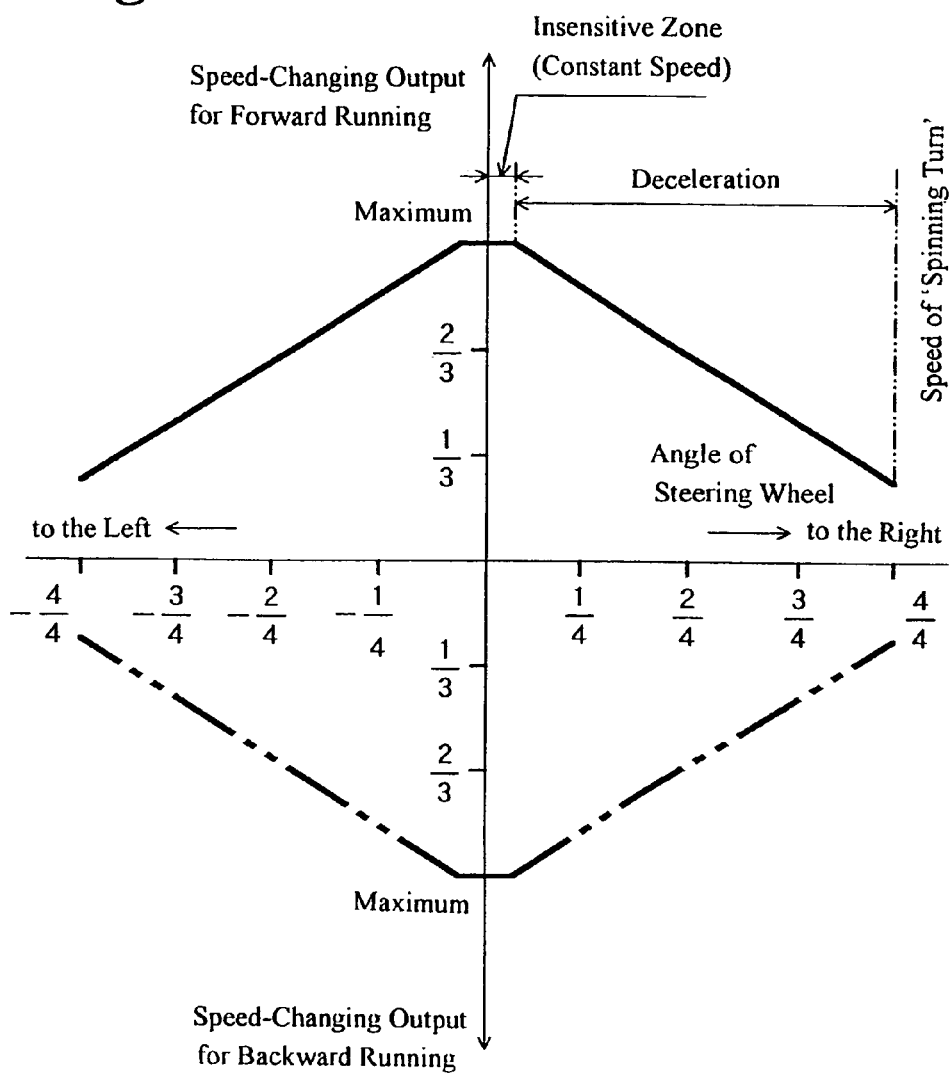
FIG. 29 is a diagram of relationship between the steering wheel and an output power for speed change.
Figure 30:
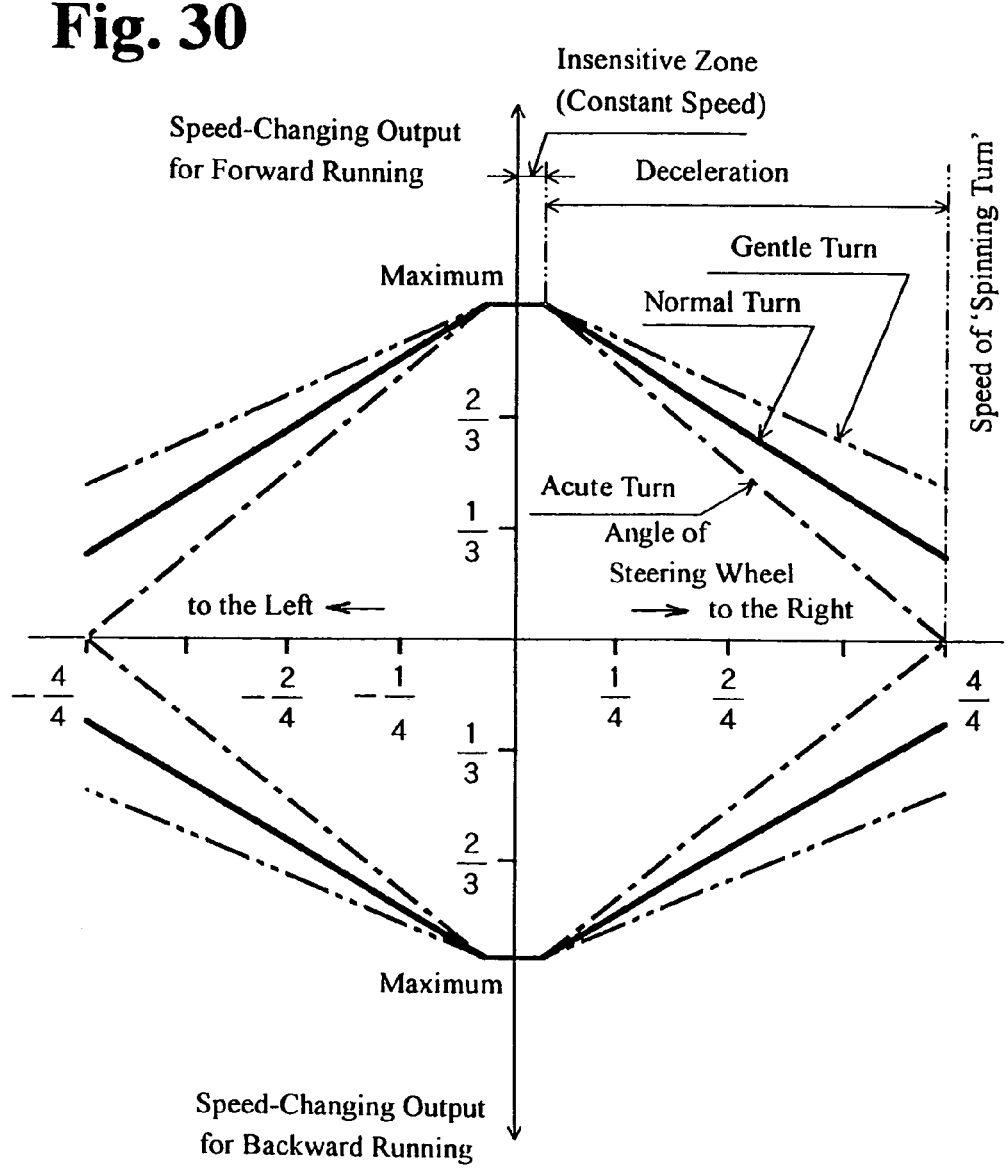
FIG. 30 is another diagram of relationship between the steering wheel and the output power for speed change.

FIGS. 29 and 30 are diagrams showing traction force imparted to the vehicle. As will be seen there, an increased angle of the steering wheel 19 renders the vehicle's actual speed lower than a target velocity that corresponds to a position which the main speed change lever 73 takes then temporarily. This means that the vehicle will be decelerated every time when the steering wheel 19 is operated, irrespective of the lever's 73 position. If however this wheel is returned to its neutral position for straight running of the vehicle, then it will consequently restore its target velocity. If, on the other occasion, the wheel 19 is operated to one of its opposite maximum limits, then the vehicle will be decelerated to its lowest speed for a spinning turn. There may be another occasion on which said wheel 19 stays in the insensitive zone (that is, up to about 15 degrees of steering in either direction). In this case, the target velocity given depending on the position of the speed change lever 73 will not be disturbed, lest any irregular or unwanted acceleration and/or deceleration should take place during a harvesting work of the vehicle. Now, a driver of the vehicle, for instance a harvesting combine, can properly steer it, without feeling any incongruity that would otherwise be caused by irregular motions of the combine. The driver can also alter reduction ratio and prefer any of acute, medium and gentle steering modes, by manually choosing one of corresponding positions of the knob-shaped member 226, taking into account the type of agricultural works, the condition of farms and the nature of crops.

Figure 31:
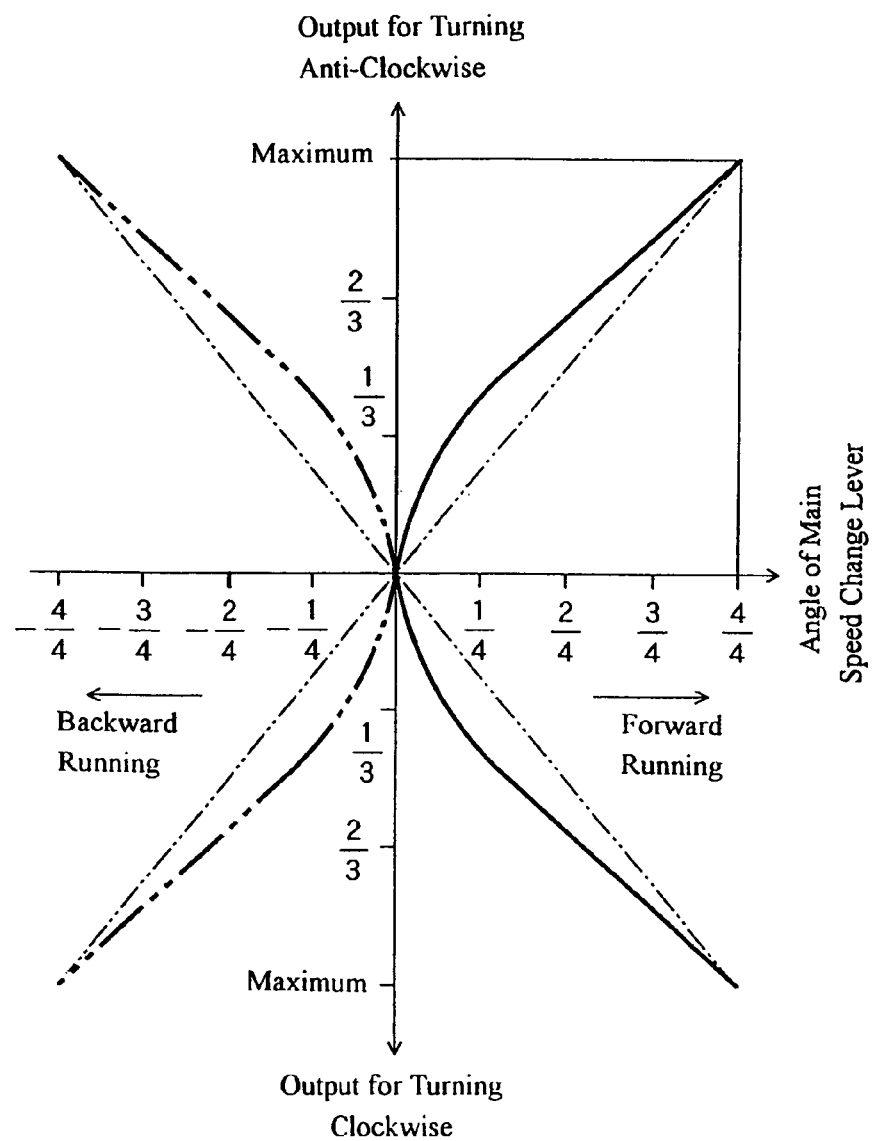
FIG. 31 is a diagram of relationship between a main speed change lever and the output power for steering the vehicle.

As seen in FIG. 31 showing a diagram of the steering outputs, a curve of secondary degree represents the relationship between an input from the main speed-change sensor 224 and an output to and controlling the steering motor 197. This input to the controller 228 corresponds to the operated angular position of the main speed change lever 73, which position is detected by that sensor 224, as described above. That output from the controller 228 is produced taking into account a signal from the steered-angle sensor 223. Due to such a relationship, even if the rotary plate in the second pump 26 is at a gentle angle to provide a low volume coefficient, a little angular displacement of the steering wheel 19 will remarkably increase the said angle while the vehicle is running slowly. In other words, characteristics of the second hydraulic pump 26 and motor 27 are modified by such an electronic means that the steering motor 197 can sensitively control the second pump 26 to sharply steer the vehicle running at a low speed. Thus, over the whole range of operable main speed change lever 73, the turning radius of crawlers 2 will remain almost constant regardless of actually operated angles of the steering wheel 19. Rather at lower speeds than at higher speeds commanded with the main speed change lever 73, here is provided a higher ratio of the controlled extent of second pump 26 to the actually operated angle of wheel 19. In still other words, even when the vehicle runs slowly with the second pump 26 less efficiently operating, a slight extent of rotating the steering wheel 19 is enough for the vehicle to make a proper turning motion. In this manner, operated angles of that wheel 19 correspond well to the thus controlled turning radii of crawlers 2, thereby improving maneuverability and function of the vehicle steering mechanism. However, if and when the main speed-change sensor 224 detects the speed change lever 73 standing then at its neutral position, the second hydraulic pump 26 will accordingly return to its own neutral position. This means that those crawlers 2 standing still are inhibited from making any turn, without adversely affecting such an improved easiness and exactness in using the wheel 19 to drive the vehicle.

Figure 32:
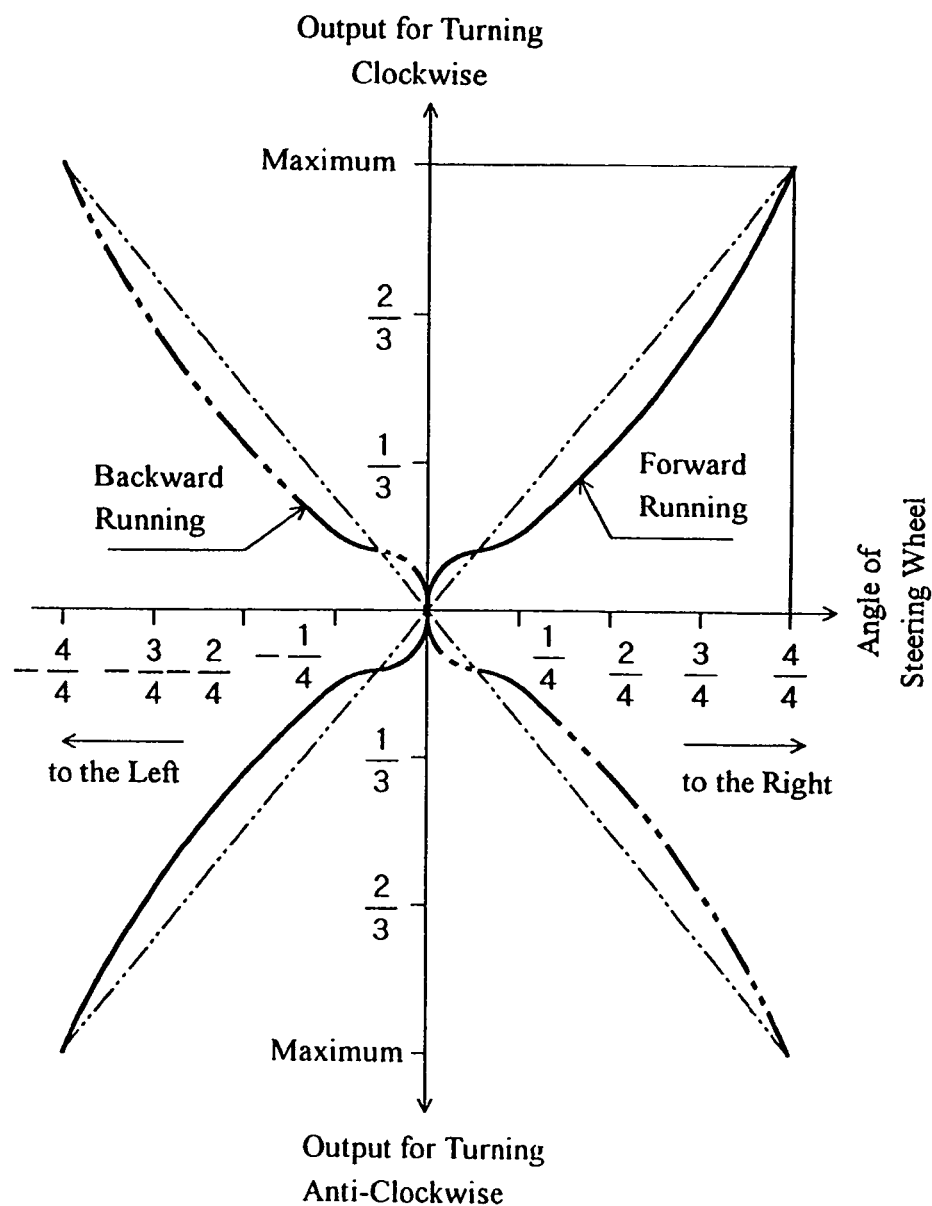
FIG. 32 is another diagram of the relationship between the steering wheel and the output power for steering the vehicle.
Figure 33:
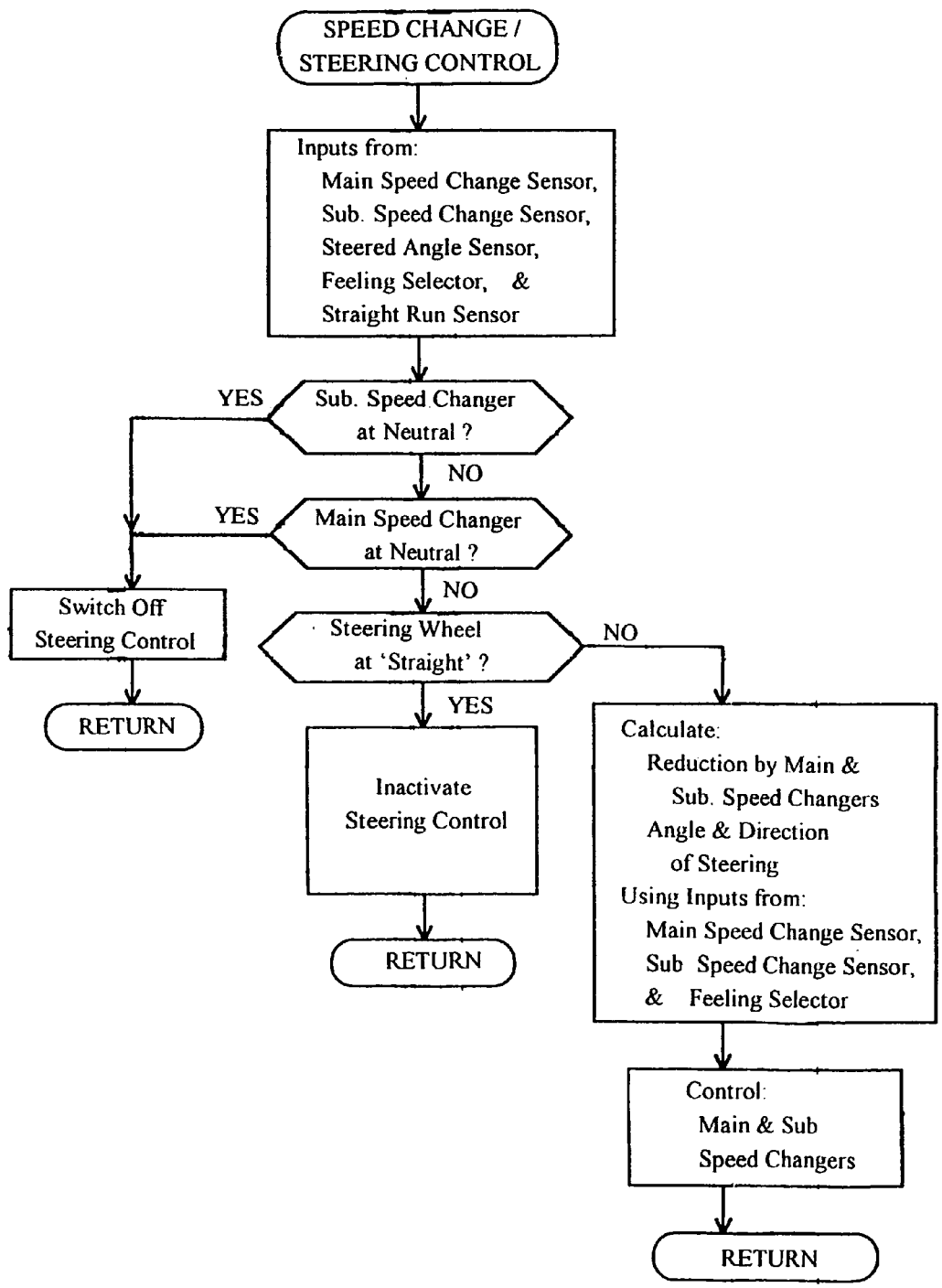
FIG. 33 is a flow chart of a program for controlling the speed change and steering mechanisms.

As seen also in FIG. 32 showing another diagram of the steering outputs, an input from the steered-angle sensor 223 to the controller 228 does correspond to the operated angular position of the steering wheel 19, as described above. Outputs from the controller 228 are not strictly proportional to steered angles, but it will give a more intensive output to the steering motor 197 to be controlled if the wheel 19 is rotated smaller angles (from about 0 to 10 degrees from neutral). If contrarily this wheel 19 is rotated larger angles (from about 10 to 70 degrees), then the output from the controller 228 to the steering motor 197 will be weakened, as compared with a case of simple proportional control. In other words, characteristics of the second hydraulic pump 26 and motor 27 are modified by such an electronic means for controlling the steering motor 197 more sensitively and intensively, within a range of relatively smaller operated angles of the steering wheel 19. Thus, even when the vehicle runs slowly with the second pump 26 and motor 27 less efficiently operating, they will work to sharply steer the crawlers 2. In other words, rather in a range of slight extents of rotating the steering wheel 19, the steering control output varies at a higher rate to sharply turn the vehicle. The vehicle can now perform a delicate correction of its running path to exactly follow any desired ridge or row of crops in a farm, thus improving steerability of the vehicle being generally straightly running for agricultural works. Further, any unnoticeably erroneous or improper handling of the wheel 19 will never cause any excessive adjustment of the running path, and the vehicle can now make a more reliable turning while running fast. The described non-linear relationship between the operated angles of said wheel 19 and the output from second pump 26 is also important herein. Such a design will contribute to adoption of the most proper steering performance in view of the characteristics of pump 26 and/or the kinds of agricultural works, further enhancing steerabilty and controllability of the vehicle.

It will now be apparent that the mobile agricultural machine provided herein comprises a pair of the left-side and right-side traction crawlers 2 that are driven through the speed change apparatus 25 at any traveling speed selected in a step-less manner using the speed change lever 73. The mobile agricultural machine further comprises the steering apparatus 28 that is operated using the steering wheel 19 so as to steplessly differentiate the relative speeds of left-side and right-side crawlers 2. The mobile is characterized in that the traveling speed controlled by means of the speed change lever 73 is reduced in proportion to an angular displacement of the steering wheel 19, wherein the ratio of speed reduction to a steered angle, i.e., the angular displacement of said wheel 19 can be altered freely at any time. By virtue of this feature, the ratio of speed reduction to the steered angle may be lowered to cause the mobile machine to make a gentle turn in wet farms and, to thus move thereon smoothly for efficient performance of various works therein. The manually operable member 226 serves to change the ratio of operated angles of steering wheel 19 to the extent of reduction of the mobile machine, any manner of steering performance can be selected readily to match the personality of a driver and the nature or kinds of works to be done, particularly in a wet farm, so as to lower loss of power and afford an improved steerability.

In this invention, the electrical speed change motor 196 is employed as an actuator to control the speed change apparatus 25 by detecting current position of the main speed change lever 73. This feature renders easier control, mounting, maintenance, adjustment and maneuverability of these apparatus 25 and lever 73. Further in this invention, the electrical steering motor 197 is employed as another actuator to control the steering apparatus 28 by detecting current position of the steering wheel 19. This further feature renders easier control, mounting, maintenance, adjustment and maneuverability of these apparatus 28 and wheel 19.

As also seen from the flow chart given in FIG. 32, input to the controller 228 are outputs from: the main speed change sensor 224, the subsidiary speed change sensor 225, the steered-angle sensor 223, the turning-mode setting device 227 and the straight-advance detecting sensor 165. With the subsidiary speed change lever 74 being detected to be at its neutral position, power to turn the vehicle will be intercepted by turning off the steering output clutch 62 to make idle the second oil-hydraulic motor 27. With the main speed change lever 73 detected at its neutral position, power to turn the vehicle will be intercepted likewise, and with the steering wheel 19 sanding at its neutral position, the steering output clutch 62 will be turned off to also make idle the second oil-hydraulic motor 27. If contrarily the subsidiary speed changer is detected to be at its position commanding middle or lower speeds, with the main speed changer being not at its neutral position when the steering wheel 19 is operated out of its straight-advance position, then the outputs from the main speed change sensor 224 and steered-angle sensor 223 will be used to calculate and determine a desirable reduction ratio given by the main speed changer together with a desirable degrees and direction of the steering motion. The electrical speed change motor 196 and the electrical steering motor 197 will thus be actuated to perform respective actions for main speed change and steering. In this way, the right and left crawlers 2 will be driven at different speeds to adjust the running path of the vehicle along any row of crops, or to make a spin at the bare end area in a farm, so that a continuous reaping and threshing work can be done therein. The manually operable member 226 may also be operated, if necessary, to control the turning-mode setting device 22 so as to gradually alter the target speeds that are desired corresponding to current operated angles of the steering wheel 19. Thus in one case of the vehicle running on road or in dry farms, the target speeds may be varied greatly relative to said operation of steering wheel 19 so as to enable shaper turnings of the vehicle. In another case of the vehicle running in wet and muddy farms, the target speeds may be varied mildly relative to the operation of steering wheel 19 so as to enable gentle turnings of the vehicle. This means that any unwanted spinning turn is avoided regardless of any possible sharp steering operation made on the vehicle running on such a wet place.

Figure 34:
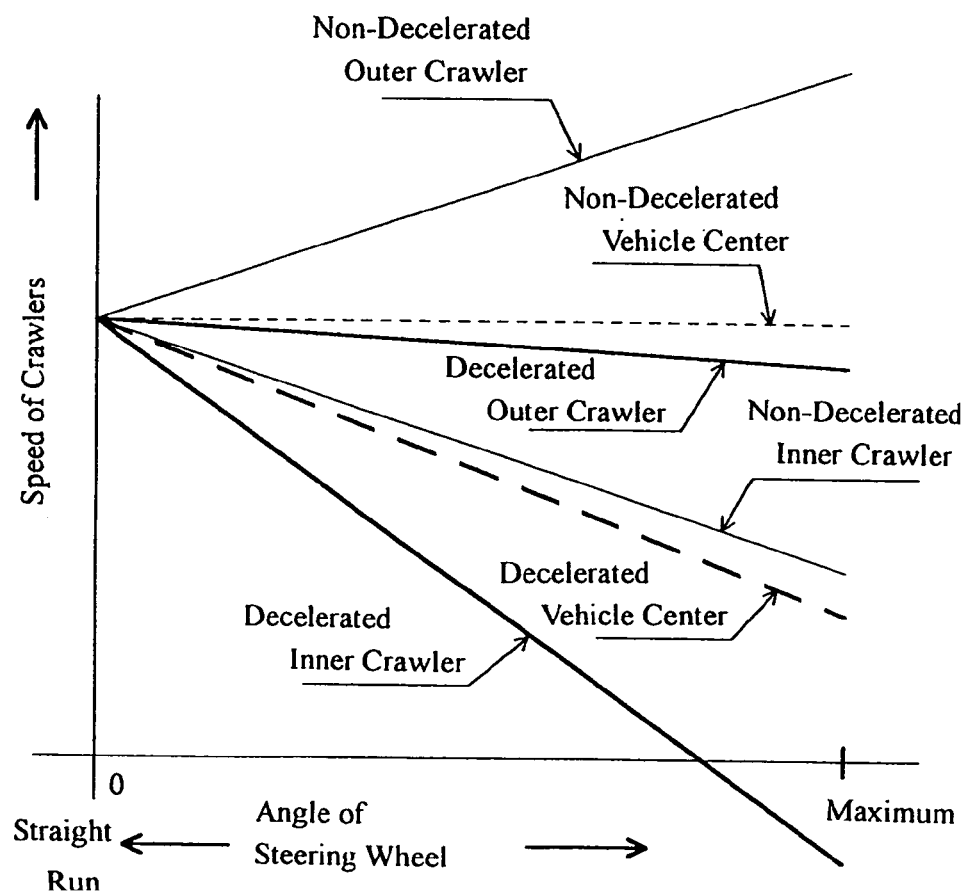
FIG. 34 is a diagram of output power applied to traction crawlers that are being steered.

FIG. 34 shows that the feeling selection lever 195 or the manually operable knob-shaped member 226 can be used to make choice between two modes, in one of which actual speed is reduced in response to operation of the steering wheel 19. In the other mode, the actual speed will not be reduced in response to any operation of the steering wheel 19. The former mode enables a reversed driving of the one crawler 2 temporarily located inwardly of a current turning radius so as to make a spinning turn, whilst the latter mode driving both the crawlers 2 in the same direction not to make any spinning turn. On the former occasion, the vehicle can do shaper turnings on road or in dry farms, whereas on the latter occasion it can do gentle but surer turnings in wet and muddy farms, thus further enhancing steerability and maneuverability of the working vehicle such as a mobile agricultural machine.

The invention claimed is:
1. A working vehicle comprising:
   a pair of right and left crawlers;
   a pair of right and left planetary gear trains;
   a speed change apparatus for outputting a step-less rotational driving force toward the pair of right and left planetary gear trains, the step-less rotational force being transmitted to the planetary gear trains so that the planetary gear trains are driven in a common direction;
   a speed change lever for controlling the speed change apparatus and thereby providing step-less altering of a running speed of the vehicle;
   a steering apparatus for outputting a step-less rotational driving force toward the pair of right and left planetary gear trains, the step-less rotational force being transmitted to the planetary gear trains so that the planetary gear trains are driven at in opposing directions with respect to each other;
   a steering wheel for controlling the steering apparatus and thereby altering a difference between velocities of the crawlers;
   the right and left planetary gear trains combining the driving force from the speed change apparatus and the driving force from the steering apparatus to produce combined driving forces, and outputting the combined driving forces to the pair of right and left crawlers, respectively;
   a first force routing mechanism for connecting between the speed change lever and the speed change apparatus so that a rotational speed of the driving force output by the speed change apparatus is decreased proportionally to an operated angle of the steering wheel; and
   a second force routing mechanism for connecting between the speed change lever and the speed change apparatus so that the rotational speed of the driving force output by the speed change apparatus is defined according to a operated amount of the speed change lever independently from the operated angle of the steering wheel; and
   wherein the first and second force routing mechanisms are alternately selectable.

2. The working vehicle as defined in claim 1, wherein:
   said first force routing mechanism is configured to effect a spinning turn in which one of the crawlers located on an inward side of a turn is rotated in a direction opposite to a rotational direction of another the crawlers located on an outward side of the turn is performed when the steering wheel is operated within a spinning turn zone greater than a predetermined operated angle in a case where the first force routing mechanism is selected; and
   said second force routing mechanism is configured to effect a non-spinning turn in which one of the crawlers located on an inward side of a turn is rotated in a same direction as a rotational direction of another of the crawlers located on an outward side of the turn is performed even when the steering wheel is operated up to a maximum steering angle beyond the predetermined angle in a case where the second force routing mechanism is selected.

3. The working vehicle as defined in claim 1, wherein the steering apparatus is connected to the steering wheel so that the rotational speed of the driving force of the steering apparatus is altered from 0 to a maximum as the steering wheel is operated from a neutral position to a predetermined angle, and wherein the first force routing mechanism is configured such that:
   the rotational speed of the driving force output by the steering apparatus is increased and the rotational speed of the driving force output by the speed change apparatus is decreased proportionally to the operated angle of the steering wheel when the steering wheel is operated within the predetermined angle when the first force routing mechanism is selected; and
   the rotational speed of the driving force output by the speed change apparatus is decreased proportionally to the operated angle of the steeling wheel while maintaining the rotational speed of the driving force output by the steering apparatus at the maximum when the steering wheel is operated beyond the predetermined angle when the first force routing mechanism is selected.

4. The working vehicle as defined in claim 1, further comprising:
   a main speed change shaft rotatable about an axis thereof according to the operation of the speed change lever;
   a speed change output shaft disposed parallel to the main speed change shaft and connecting to the speed change apparatus so as to alter the rotational speed of the driving force of the speed change apparatus according to a rotation of the speed change output shaft around an axis thereof;
   a direct interconnect shaft and a reducing interconnect shaft supported around the speed change output shaft in a relatively rotatable manner;
   the direct interconnect shaft being connected to the main speed change shaft through the second force routing mechanism so as to be rotated around the axis of the speed change output shaft by an amount corresponding to rotational amount of the main speed change shaft around the axis of the main speed change shaft;
   the reducing interconnect shall being connected to the main speed change shaft through the first force routing mechanism so as to be rotated around the axis of the speed change output shaft by an amount that is defined by subtracting an amount corresponding to the operated angle of the steering wheel from the amount corresponding to the rotational amount of the main speed change shaft around the axis of the main speed change shaft; and a clutch shaft inserted into a bore in the speed change output shaft in a slidable manner along the axis thereof and selectively connecting either one of the reducing interconnect shall or the direct interconnect shaft to the speed change output shaft by being slid along the axis.

5. The working vehicle as defined in claim 4, further comprising:

a steering input shaft connecting to the steering wheel and being rotatable around a vertical axis of the steering input shaft;

a speed change input shaft connecting to the speed change lever and being rotatable around a horizontal axis of the speed change input shaft;

a steering input member connecting to the steering input shaft and being mounted on the speed change input shaft in a rotatable manner around the vertical axis of the steering input shaft;

a speed change output member provided at the speed change output shaft that is disposed parallel to the axis of the speed change input shaft;

a speed change link connecting the speed change input member and the speed change output member;

a steering output shaft disposed substantially parallel to the axis of the speed change input shaft;

a steering output member provided at the steering output shaft;

a steering link connecting the steering input member and the steering output member;

a steering joint portion disposed at a connection between the steering input member and the steering link;

a speed change joint portion disposed at a connection between the steering input member and the speed change link;

the steering joint portion being aligned with the axis of the speed change input shaft when the steering wheel is positioned at the neutral position; and the speed change joint portion being arranged on a circle having a center at which the axes of the speed change input shaft and the steering input shaft interest to each other, and being spaced by 90 degrees from the steering joint portion around the center.

6. The working vehicle as defined in claim 1, further comprising:

a speed change output interconnecting portion disposed at a connection between the speed change link and the speed change output member;

a steering output interconnecting portion disposed at a connection between the steering link and the steering output member; and the speed change output interconnecting portion and the steering output interconnecting portion being disposed coaxially with the axis of the steering input shaft so that displacement trajectories of the speed change link and the steering link form a reversed-conical shape.

7. A working vehicle comprising:

a pair of right and left crawlers;

a pair of right and left planetary gear trains;

a speed change apparatus for outputting a step-less rotational driving force toward the pair of right and left planetary gear trains, the step-less rotational force being transmitted to the planetary gear trains so that the planetary gear trains are driven in a common direction to each other;

a speed change lever for controlling the speed change apparatus and thereby providing step-less altering of running speed of the vehicle;

a steering apparatus for outputting a step-less rotational driving force toward the pair of right and left planetary gear trains, the step-less rotational force being transmitted to the planetary gear trains so that the planetary gear trains are driven in opposite directions with respect to each other;

a steering wheel for controlling the steering apparatus and thereby altering difference between velocities of the crawlers;

the right and left planetary gear trains combining the driving force from the speed change apparatus and the driving force from the steering apparatus to produce combined driving forces, and outputting the combined driving forces to the pair of right and left crawlers, respectively;

a main speed change sensor for detecting an operated position of the speed change lever;

a steered angle sensor for detecting an operated angle of the steering wheel;

a speed change motor for altering the rotational speed of the driving force output by the speed change apparatus;

a steering motor for altering the rotational speed of the driving force output by the steering apparatus;

a speed change/steering controller for controlling the speed change motor based oil a signal from the main speed change sensor so that the rotational speed of the driving force output by the speed change apparatus is increased proportionally to the operated amount of the speed change lever, and controlling the steering motor based on a signal from the steering sensor so that the rotational speed of the driving force output by the steering apparatus is increased proportionally to the operated angle of the steering wheel, the speed change/steering controller being configured to have:

a speed non-reduction mode for controlling the speed change motor so that the rotational speed of the driving force output by the speed change apparatus is altered according to the operated amount of the speed change lever independently from the operated angle of the steering wheel; and a speed reduction mode for controlling the speed change motor so that the rotational speed of the driving force output by the speed change apparatus is decreased proportionally to the operated angle of the steering wheel with respect to the speed defined by the operated amount of the speed change lever; and a turning-mode setting device for selecting the speed reduction mode or the speed non-reduction mode; and wherein the speed change/steering controller is configured to effect:

a spinning turn in which one crawler located on an inward side of a turn is rotated in a direction opposite to a rotational direction of the other crawler located on an outward side of the turn is performed, when the steering wheel is operated within a spinning turn zone greater than a predetermined operated angle in a case where the speed reduction mode is selected; and a non-spinning turn in which one crawler located on an inward side in turning is rotated in a same direction as a rotational direction of the other crawler located on an outward side in turning is performed even when the steering wheel is operated at a maximum angle in a case where the speed non-reduction mode is selected.

8. A working vehicle is defined in claim 7, wherein the speed change/speed controller does not perform a speed reduction control in which the rotational speed of the driving force output by the speed change apparatus is decreased proportionally to the operated angle of the steering wheel, when the steering wheel is operated in an insensitive zone within a predetermined angle with the neutral position as a reference even in a case where the speed reduction mode is selected.

* * * * *